(12) United States Patent  
Derks et al.

(10) Patent No.: US 8,540,557 B1
(45) Date of Patent: Sep. 24, 2013

(54) WALL CURB FOR AIR TREATMENT SYSTEM

(75) Inventors: Irvin Lee Derks, Bryan, OH (US); James L. Austermiller, Defiance, OH (US); Randall S. Price, Bryan, OH (US)

(73) Assignee: Bard Manufacturing Company, Bryan, OH (US)

( * ) Notice: Subject to any disclaimer, the term of this patent is extended or adjusted under 35 U.S.C. 154(b) by 2093 days.

(21) Appl. No.: 11/194,807

(22) Filed: Aug. 1, 2005

Related U.S. Application Data

(60) Provisional application No. 60/598,002, filed on Aug. 2, 2004.

(51) Int. Cl.
*G06F 1/16* (2006.01)

(52) U.S. Cl.
USPC .......................................................... 454/184

(58) Field of Classification Search
USPC .................................. 454/184, 185, 262, 292
See application file for complete search history.

(56) References Cited

U.S. PATENT DOCUMENTS

| | | | |
|---|---|---|---|
| 1,916,908 A * | 7/1933 | Lewis et al. .................... | 181/224 |
| 3,159,091 A | 12/1964 | Schutt | |
| 3,177,795 A | 4/1965 | Schutt | |
| 4,008,653 A | 2/1977 | Tatham | |
| 4,169,500 A | 10/1979 | Braver | |
| 4,605,160 A | 8/1986 | Day | |
| 4,854,376 A | 8/1989 | Tunekawa et al. | |
| 5,031,514 A | 7/1991 | Kice | |
| 5,290,188 A | 3/1994 | Kiser et al. | |
| 5,404,934 A | 4/1995 | Carlson et al. | |
| 5,444,990 A | 8/1995 | McGill, III et al. | |
| 5,462,484 A | 10/1995 | Jung et al. | |
| 5,657,641 A * | 8/1997 | Cunningham et al. .......... | 62/263 |
| 5,913,723 A | 6/1999 | Ribo | |
| 6,099,406 A | 8/2000 | Demster | |
| 6,230,510 B1 | 5/2001 | Price | |
| 6,264,551 B1 | 7/2001 | Smith | |
| 6,315,656 B1 * | 11/2001 | Pawlowski ..................... | 454/184 |
| 6,321,557 B1 | 11/2001 | Scrivener et al. | |
| 6,351,381 B1 * | 2/2002 | Bilski et al. ................... | 361/695 |
| 6,370,899 B1 | 4/2002 | Hobbs et al. | |
| 6,431,979 B1 | 8/2002 | Asbjornson et al. | |
| 6,459,578 B1 * | 10/2002 | Wagner ......................... | 361/694 |
| 6,494,779 B1 * | 12/2002 | Nicolai et al. ................ | 454/184 |
| 6,535,382 B2 * | 3/2003 | Bishop et al. ................. | 361/690 |
| 6,571,572 B2 | 6/2003 | Hobbs et al. | |
| 6,742,583 B2 * | 6/2004 | Tikka ............................. | 165/291 |
| 2002/0184909 A1 | 12/2002 | Hobbs et al. | |
| 2003/0124970 A1 * | 7/2003 | Webster et al. ............... | 454/184 |
| 2003/0199245 A1 * | 10/2003 | Akhtar .......................... | 454/262 |
| 2004/0007347 A1 * | 1/2004 | Stoller ........................... | 165/47 |

* cited by examiner

*Primary Examiner* — Steven B McAllister
*Assistant Examiner* — Samantha Miller
(74) *Attorney, Agent, or Firm* — McDonnell Boehnen Hulbert & Berghoff LLP

(57) ABSTRACT

A device for reducing sound from an air treatment unit includes, in one embodiment, a wall curb. The air treatment system includes a supply opening and a return opening. The wall curb includes a frame portion defining an interior chamber. A partition divides the interior chamber into a supply plenum in a first portion of the interior chamber and a return plenum in a second portion of the interior chamber. A curb supply opening is formed through the perimeter frame in communication with the supply plenum. A curb return opening is formed through the perimeter frame in communication with the return plenum. The curb return opening is positioned such that airflow through the return plenum is non-linear and a sound absorbing material may be positioned on at least some inside surfaces of the return plenum.

12 Claims, 29 Drawing Sheets

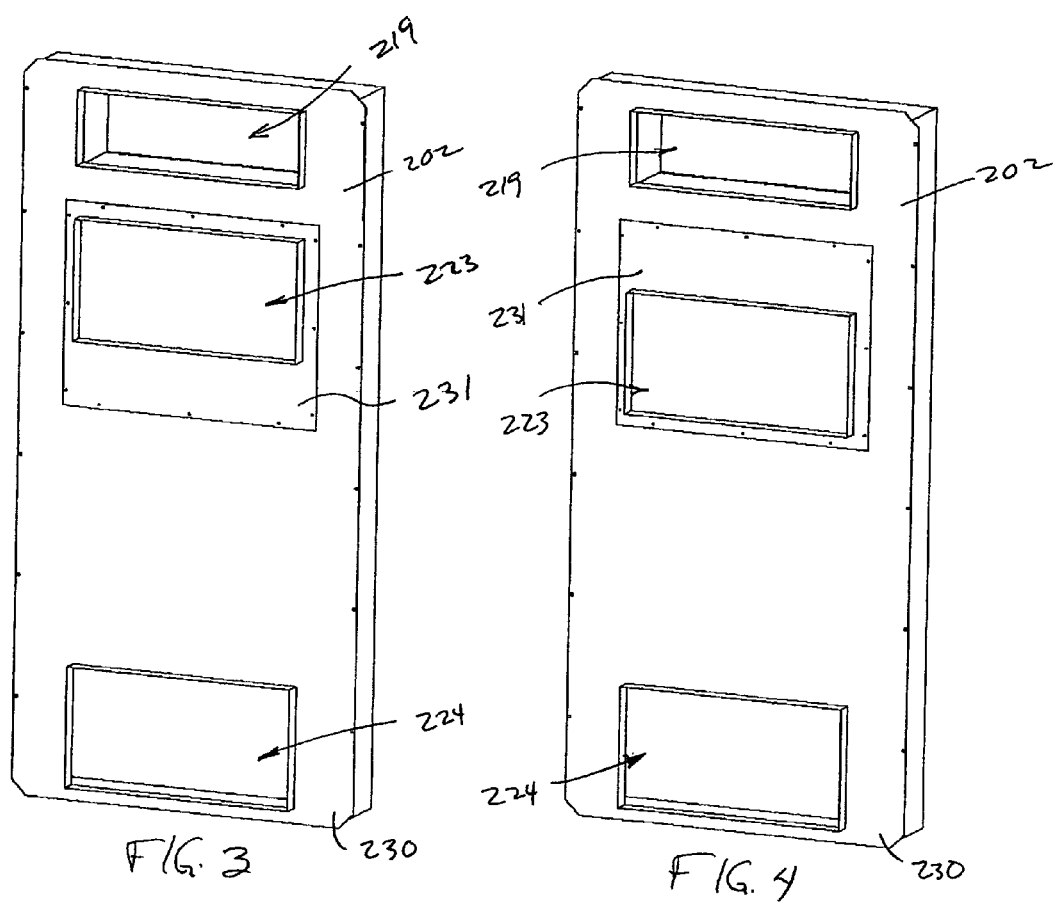

WALL CURB FOR AIR TREATMENT SYSTEM

This application claims benefit of U.S. Provisional Application No. 60/598,002, filed Aug. 2, 2004.

FIELD OF THE INVENTION

This invention is generally related to a mounting frame or wall curb for an air treatment system, for example, an air conditioning unit. During operation of the unit, the wall curb functions to reduce sound emitted from the unit and as a result, less sound is conveyed into a building to which it is attached. More particularly, the wall curb may provide one or both of air return and supply flow according to an indirect path which reduces emitted noise from the air treatment unit.

BACKGROUND OF THE INVENTION

The use of air treatment units in home, commercial and institutional facilities has been well accepted. These units (hereinafter collectively referred to as HVAC) typically provide heating, ventilation, dehumidification and/or air conditioning to a facility. Some examples of these air treatment units include, in particular, wall mounted HVAC units. Wall mount air treatment units include all of the necessary functional elements to condition and circulate air, and typically include circulating fans, a compressor, air cooling and heating heat exchangers, and filters. These elements of the unit are all typically mounted within or associated with a common housing provided with air intakes and exhausts as well as air supply and air return openings or ducts. The housing is mounted to a wall of a building, which is provided with spaced openings corresponding to the air supply and air return openings of the unit whereby conditioned air may be supplied to one or more rooms of the building via the supply opening and removed therefrom via the return opening.

When HVAC units are attached directly to a building wall and connected to one or more rooms by openings formed through room walls and/or ductwork, a relatively new structure by which air treatment units may be attached to the building to be supplied with conditioned air is referred to as a curb. At the present time, curbs function largely as a convenient means by which different sized air treatment units may be adapted to a pre-existing opening in a building.

One common application for wall mount units includes the heating, cooling and ventilation of school facilities and classrooms. Until recently, maximum allowable sound levels for these types of units have been largely unregulated. However, in the late 1990s the Los Angeles Unified School District (LAUSD) issued specifications permitting a maximum of 50 dbA background sound levels in classrooms. Manufacturers of air treatment units have been compelled to contemplate significant and expensive redesign of HVAC units in order to contribute less air treatment noise to the overall sound levels. Recently, some specifications have required a maximum of 45 dbA and, more recently, the American National Standards Institute (ANSI) passed a sound standard for schools requiring a maximum sound level of 35 dbA. The Acoustical Society of America, for example, and others are now attempting to get this latest, more stringent limit written into specifications.

The 35 dbA specification may prove to be a difficult standard to meet, and in some instances may prove to be impossible without a major redesign of existing units and, of course, the costs will ultimately be passed on to consumers (and to taxpayers). Accordingly, there is a demand for wall mount HVAC units that generate and contribute to the schoolroom or any room environment a minimal amount of noise, and which preferably is accomplished without a major and expensive redesign of existing products. The present invention greatly reduces sound levels and thus satisfies the demand.

SUMMARY OF THE INVENTION

The present invention, in one aspect, includes a wall curb for reducing the sound emitted from an air treatment system. The air treatment system includes a supply opening and a return opening. The wall curb includes a perimeter frame defining an interior chamber. A partition divides the interior chamber into a supply plenum in an upper portion of the interior chamber and a return plenum in a lower portion of the interior chamber. A curb supply opening is formed through the perimeter frame in communication with the supply plenum. A curb return opening is formed through the perimeter frame in communication with the return plenum. The curb return opening may be positioned such that airflow through the return plenum is non-linear and a sound absorbing material may be positioned on at least some inside surfaces of the return plenum.

Other aspects of the present invention may include a wall curb wherein the perimeter frame includes a curb back panel, spaced apart longitudinal curb side panels and opposed curb bottom and curb top panels. The wall curb may include a partition that extends between the longitudinal curb side panels. The wall curb may include a curb supply opening and a curb return opening formed through the curb back panel. The wall curb may further include an invertible insert positioned within the curb return opening. The return opening may be positioned in a portion of the curb back panel adjacent and below the partition. The return opening may be positioned in a portion of the curb back panel adjacent and above the bottom panel. The return opening may include a pair of openings formed through the curb back panel, a first of which is adjacent and below the horizontal panel and a second of which is adjacent and above the bottom panel. The bottom panel may include an exhaust vent. A damper may be positioned within the return plenum for controlling airflow of return air through the exhaust vent.

The wall curb may further include an exhaust blower positioned within or in communication with the return plenum for regulating airflow of return air through the exhaust vent. A dehumidification mechanism or exhaust blower may be positioned within or in communication within the return plenum. The dehumidification unit preferably functions to dehumidify return air. The dehumidification mechanism or blower may be removably fastened within, disposed within or adjacent the return plenum. The wall curb may further include a top outlet box, which is attached to and extends upwardly from the curb top panel and includes an interior in communication with the curb supply plenum. The curb supply opening is preferably formed through the top outlet box. The airflow through the curb supply plenum may be non-linear.

Another aspect of the present invention provides an air treatment unit with an integrated sound reduction plenum. The air treatment unit includes a unit housing including a vertical partition. A unit supply opening is formed in the vertical partition. A unit return opening is formed in the vertical partition and spaced from the unit supply opening a first distance. A curb portion of the unit housing defines with the vertical partition an interior chamber. A horizontal partition separates the interior chamber into a supply plenum in an upper portion of the interior chamber in communication with the unit supply opening and a return plenum in a lower portion of the interior chamber in communication with the unit return opening. A curb supply opening is formed in the curb portion of the unit housing in communication with the supply plenum. A curb return opening is formed in the curb portion of the unit housing in communication with the return plenum, wherein the curb return opening may be positioned so as to define a non-linear air flow path through the return plenum with the unit return opening. A sound absorbing material may be positioned on at least some inside surfaces of the return plenum. Of course, the invention contemplates the reverse configuration of the supply plenum and the return plenum with appropriate adjustments to other aspects of the unit and curbs portions.

Yet another aspect of the present invention provides an air treatment unit with an integrated sound plenum. The air treatment unit includes a unit housing including opposed front and back panels, spaced apart longitudinal side panels and opposed bottom and top panels. A unit supply opening may be formed in the back panel. A unit return opening is formed in the back panel and spaced from the unit supply opening a first distance. A curb frame includes a curb back panel, spaced-apart longitudinal curb side panels and opposed curb bottom and curb top panels defining an interior chamber. A partition extends between the longitudinal curb side panels and defines with the curb frame, a supply plenum in an upper portion of the interior chamber in communication with the unit supply opening and a return plenum in a lower portion of the interior chamber in communication with the unit return opening. A curb supply opening is formed through the curb back panel in communication with the supply plenum. A curb return opening is formed through the curb back panel in communication with the return plenum, wherein the curb return opening is positioned so as to define a non-linear airflow path through the return plenum with the unit return opening. A sound absorbing material may be positioned on at least some inside surfaces of the return plenum.

Other aspects of the present invention provide an air treatment unit with an integrated sound plenum wherein the curb supply opening and the curb return opening may be spaced a second distance, and wherein the second distance is equal to the first distance. The first distance may be a vertical distance and the second distance may also be a vertical distance. The curb supply opening may be positioned so as to define a non-linear air flow path through the supply plenum with the unit supply opening. The curb return opening may be positioned in a portion of the back panel adjacent and below the partition. The return opening may be positioned in a portion of the back panel adjacent and above the bottom panel. The curb bottom panel may include an exhaust vent. The return opening may include a pair of openings formed through the curb back panel, a first of which is adjacent and below the horizontal panel and a second of which is adjacent and above the bottom panel. The air treatment unit may further include a damper positioned within the return plenum for controlling airflow of return air through the exhaust vent. The air treatment unit may further include an exhaust blower positioned within the return plenum for controlling airflow of return air through the exhaust vent. The air treatment unit may further include a dehumidification mechanism positioned within or in communication with the return plenum. The dehumidification unit preferably functions to dehumidify return air. The dehumidification mechanism may be removably fastened or disposed within or in communication with the return plenum.

Yet another aspect of the present invention provides a wall mount air treatment unit with an integrated sound reduction plenum and includes a unit housing with opposed front and back panels, spaced apart longitudinal side panels and opposed bottom and top panels. A supply plenum is defined in the housing adjacent the back panel and the top panel. A return plenum is defined in the unit housing adjacent the back panel and the bottom panel. A supply opening is formed in the back panel in communication with the supply plenum. A return opening is formed in the back panel in communication with the return plenum and a sound absorbing material may be positioned on at least some inside surfaces of the return plenum.

Yet another aspect of the present invention provides a wall mount air treatment unit including an integrated sound reduction plenum, including a unit housing including opposed front and back panels, spaced apart longitudinal side panels and opposed bottom and top panels. A top outlet box extends from the top panel. A supply plenum is defined in the housing adjacent the back panel and the top panel and in communication with the top outlet box. A return plenum is defined in the unit housing adjacent the back panel and the bottom panel. A supply opening is formed in the top outlet box in communication with the supply plenum. A return opening is formed in the back panel in communication with the return plenum and a sound absorbing material is positioned on at least some inside surfaces of the return plenum. Other aspects of the present invention provide a wall mount air treatment unit wherein airflow through the supply plenum and the return plenum may be non-linear.

Yet another aspect of the present invention provides a vibration curb for a wall mount air treatment unit, including an inner frame adapted to mount to a wall. An outer frame is sized and shaped to surround the inner frame in a spaced configuration and a plurality of vibration isolation elements are interposed between the inner frame and the outer frame.

These and other features and advantages of the present invention will be further understood upon consideration of the following detailed description of an embodiment of the present invention, taken in conjunction with the accompanying drawings.

BRIEF DESCRIPTION OF THE DRAWINGS

FIG. 3 is a rear perspective view of a wall curb with one embodiment of a invertible return air insert in a first position according to the present invention;

FIG. 4 is a rear perspective view of the wall curb of FIG. 3 with the invertible return air insert in a second position;

FIG. 15A is a side sectional view of another alternate embodiment of the HVAC unit and integrated sound reduction plenum of FIG. 15;

FIG. 16A is another embodiment of a vibration curb;

FIG. 17A is an assembled perspective view of the vibration curb of FIG. 16A;

FIG. 18A is an end view of the detail of FIG. 18;

FIG. 18B is a side view of the detail of FIG. 18;

DETAILED DESCRIPTION OF EMBODIMENTS OF THE INVENTION

Embodiments of the invention described herein are particularly adapted for use with commercially available wall mount HVAC units. For example, a wall curb of the present invention may be used with a wall mount air treatment unit, WH series model, manufactured by Bard Manufacturing Company of Bryan, Ohio, U.S.A. Of course, any suitable wall mount air treatment units may be used with an embodiment of the wall curb of the present invention. It will be recognized that different sized and shaped units may require an adjustment of the size and/or shape of the curb to which the unit will be attached as well as types of fasteners to couple the unit to the curb and the curb to a wall.

Figure 7:
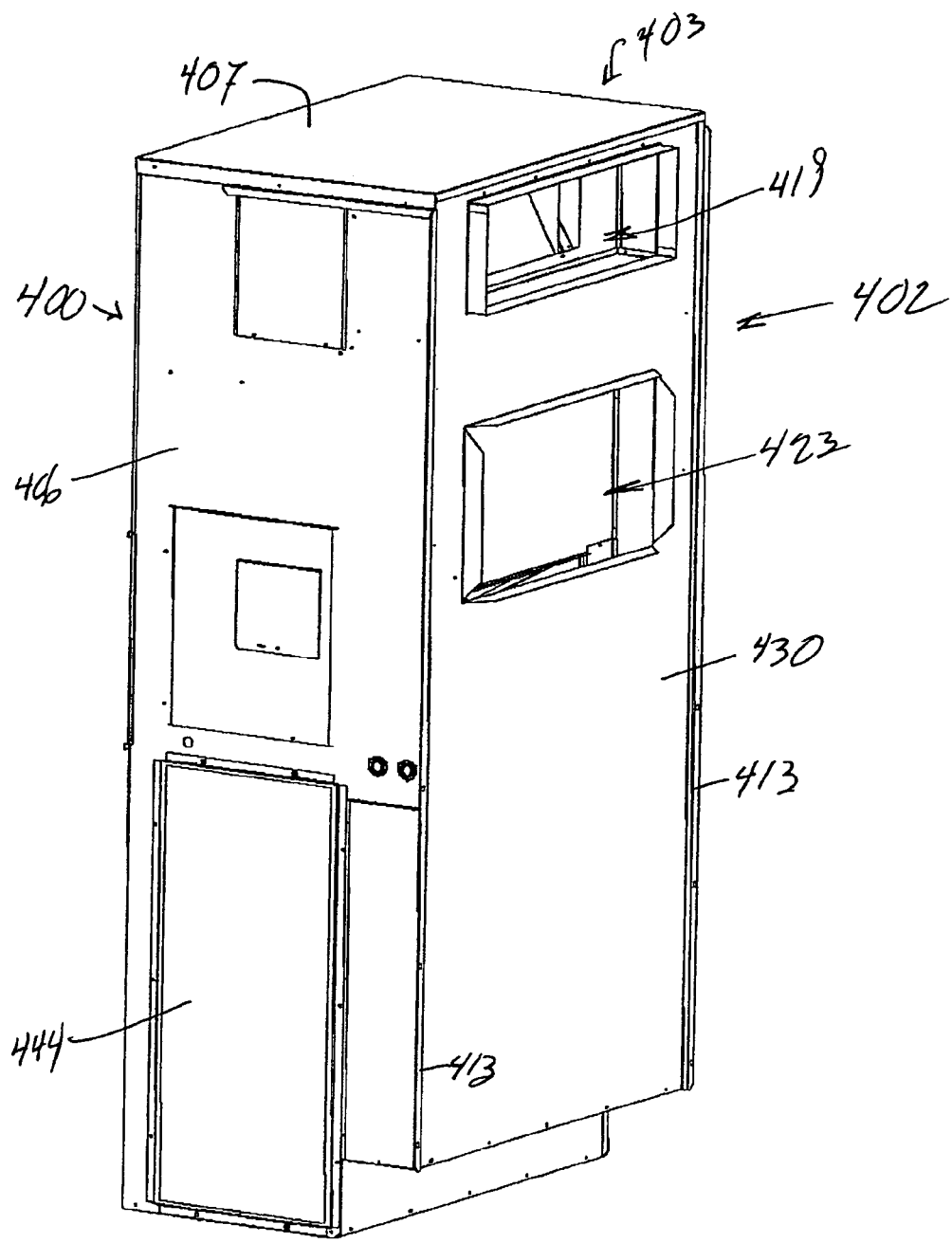
FIG. 7 is a rear perspective view of a HVAC unit and an integrated sound reduction plenum.

The wall curb described herein may be provided as a separate enclosure so that existing wall mount HVAC units may be coupled thereto in an existing installation and thereby receive the sound reduction and/or vibration benefits of the present wall curb without having to redesign or provide a new HVAC unit. It will be understood that the invention also contemplates integration of an HVAC unit and curb into a wall mount or self-contained enclosure or construct, with all or some of the benefits realized by a separate HVAC unit and curb. An example of a combined or integrated HVAC unit and wall curb is shown in FIG. 7, for example, and will be discussed fully below. For purposes of this application, the term wall curb may be used when referring to a separate curb or a portion of a HVAC unit having an integrated curb portion or in the alternate an integrated sound reduction plenum.

Figure 1:
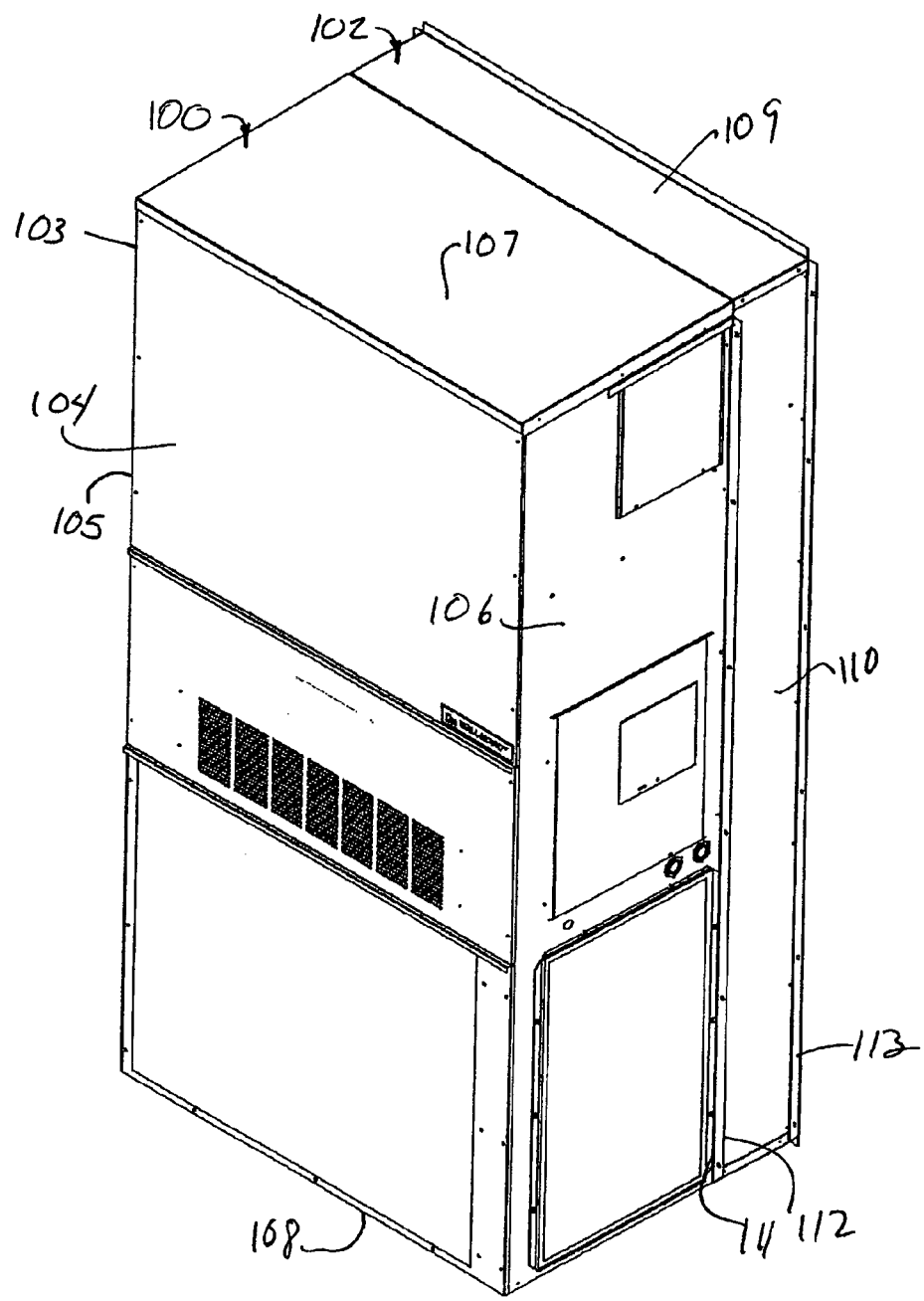
FIG. 1 is a front perspective view of a HVAC unit and one embodiment of a wall curb according to the present invention.

Turning to FIG. 1, an air treatment or HVAC unit, generally shown at 100 is shown detachably coupled to an embodiment of a wall curb of the present invention, which is shown generally at 102. The air treatment unit 100 includes a housing 103, which is separate from the wall curb 102. The housing 103 may be generally rectangular in shape and includes most or all of the operational elements of the air treatment unit contained therein. The housing 103 includes a front panel 104, which faces away from a building wall, left and right panels 105, 106, a top panel 107 and a bottom panel 108. Preferably, the panels of the housing 103 are sheet metal, but it will be recognized that any suitable material may be used.

When installed, the air treatment unit 100 is attached to a wall curb 102, which is formed of a rectangular enclosure generally matching that of the unit 100. The wall curb 102 includes a curb top panel 109, a curb bottom panel (not shown) opposite the top panel, a curb right side panel 110 and a curb left side panel (not shown) opposite the curb right side panel.

The air treatment unit 100 preferably attaches to the wall curb 102 in a reasonably airtight fashion. In one embodiment, the air treatment unit 100 attaches to the wall curb 102 by way of radially extending unit flanges 111, which match with radially extending curb front flanges 112. The unit 100 may also be attached to the wall curb 102 by other means well known in the art, such as, for example, an extending lip (not shown) from the curb 102. The curb 102 is preferably mounted by way of curb rear flanges 113 in combination with conventional wall mount fasteners (i.e., screws, expansion bolts, and so on).

Figure 2:
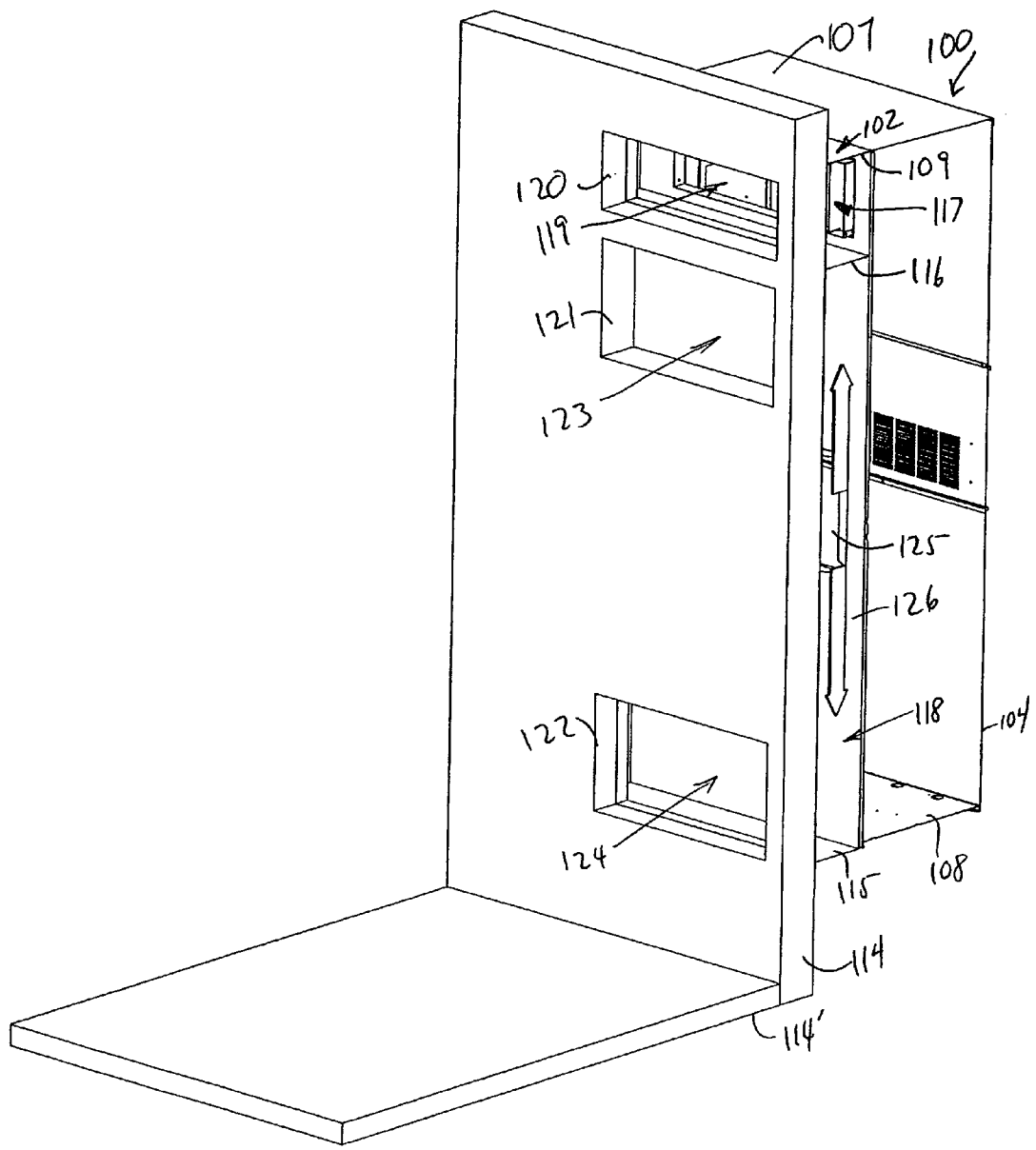
FIG. 2 is a perspective view of the unit and wall curb of FIG. 1 in a cutaway view of a building application.

Referring to FIG. 2 an air treatment unit 100 is shown attached to a wall curb 102, which is in turn installed in position on a wall 114. For reference, the wall 114 is shown with a floor 114'. In the embodiment shown, the top panel 107 and bottom panel 108 of the air treatment unit 100 are mated to a curb top panel 109 and a curb bottom panel 115. Although not shown, respective side panels of unit 100 and curb 102 are also attached. The curb 102 includes an internal partition 116 positioned between and generally parallel to the curb top and bottom panels 109, 115. The partition 116 may be angled from the horizontal, which may provide additional sound reduction benefits. The internal partition 116 separates the interior space of the wall curb 102 into a supply plenum 117, occupying the top of the curb, and a return plenum 118 occupying the bottom of the curb.

The supply plenum 117 is located between the curb top panel 109 and internal partition 116 and functions to convey supply air from the air treatment unit 100 through a supply opening 119 into the curb 102 and then through a supply opening 120 in room wall 114. Return air enters the curb 102 through upper and lower return wall openings 121, 122 in wall 114 through a curb upper return opening 123 and a curb lower return opening 124, which are respectively aligned with the upper and lower return wall openings. As will be described more fully below, the curb return openings in alternate embodiments may be provided as single or multiple openings and may have a number of arrangements.

Return air entering wall curb 102 enters the return plenum 118 and enters a unit return opening 125 formed in a back panel 126 of the unit 100. The path taken by the return air through the return air plenum 118 forms an indirect path, i.e., not a straight line through the wall 114, curb 102 and into the unit 100. The indirect path taken by the return air may be considered a zigzag or a tortuous path through the return air plenum 118, although other shapes of indirect airflow through the curb may yield a reduced sound emission from the unit 100 as compared to a straight path. It will be understood that any indirect airflow path through a wall curb which yields reduced noise is contemplated by the invention.

Figure 5:
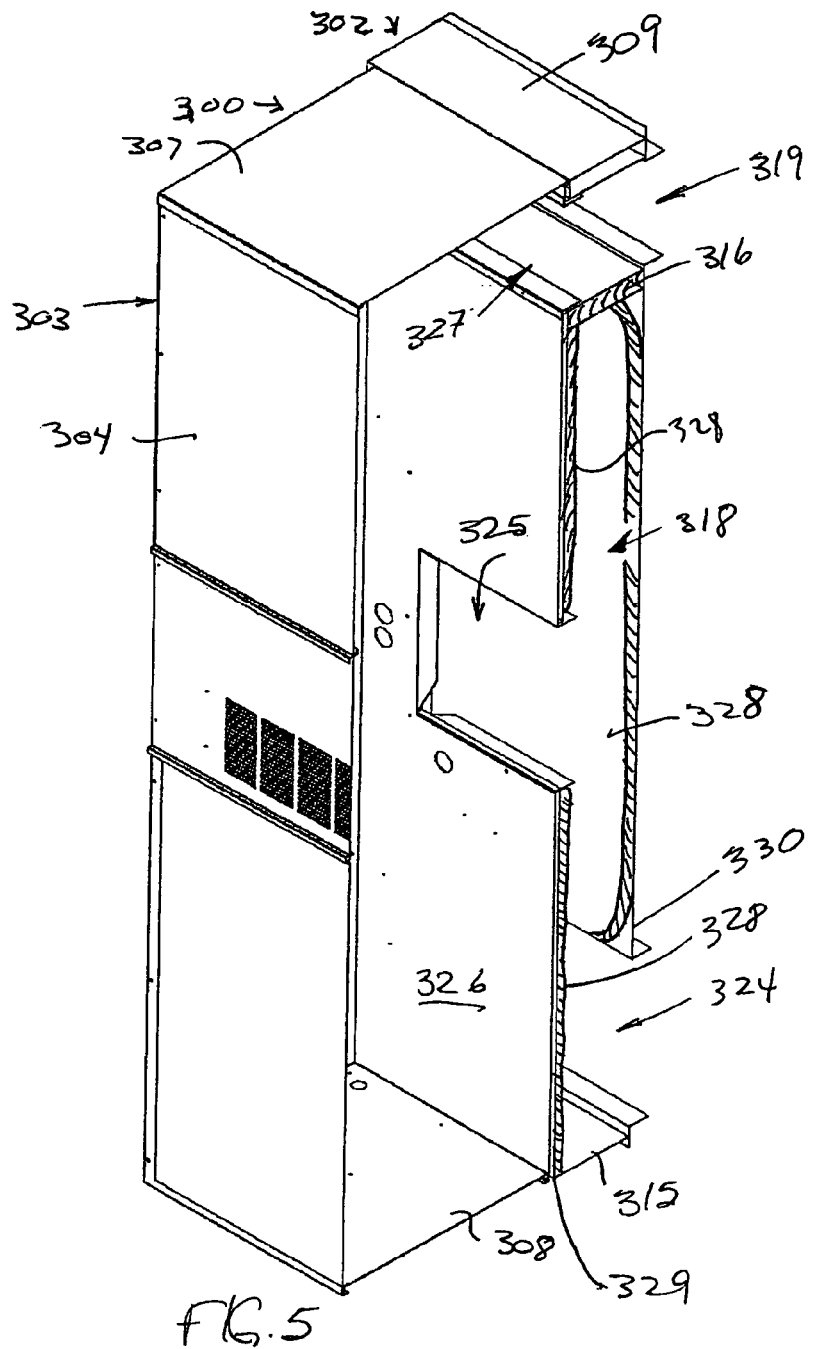
FIG. 5 is a cutaway perspective view of a HVAC unit and another embodiment of a wall curb according to the invention.

In a preferred embodiment, interior surfaces defining the return air plenum 118 include a sound-absorbing material or an acoustical control liner (not shown in FIG. 2, see FIG. 5, for example). This material may be, for example, fiberglass insulation, an elastomeric material, a textured material, sound absorbing foam, or any suitable material having sound deadening or absorbing properties or properties which reduce sound energy. A preferred material is one inch thick Micromat® manufactured by Johns Manville.

The sound absorbed may be generated by the return air itself passing through the curb and unit, for example, or may also be generated by airflow within the air treatment unit 100. Furthermore, mechanical noises originating from internal mechanisms in the air treatment unit 100 or curb 102 are at least partially absorbed within the plenum 118. Noise originating from outside is also reduced. The non-linear or tortuous air flow path through the return air plenum 118 is a feature of one embodiment of the invention, which, in some embodiments, permits the use of existing air treatment units in existing installations. The indirect air flow path, in other embodiments of the invention, in combination with other features of the curb of embodiments of the present invention, provides a significantly reduced transmission of sound from the unit 100 and other sounds to the room interior.

FIGS. 3 and 4 show a wall curb 202 similar to the curb of FIG. 2 and including a rear panel 230. The rear panel 230 includes an invertible insert 231 positioned within one of the curb return openings. The curb rear panel 230 may include an optional lower return curb opening 224 near a lower edge of the panel and a supply opening 219 near an upper edge of the panel. An upper return curb opening 223 includes the invertible insert 231 positioned therein.

The invertible insert 231 may be temporarily detached from the curb rear panel 230 and rotated so that the relative position of the opening 223 between the supply opening 219 and lower return curb opening 224 can be altered. In other words, the effective opening provided by the insert 231 may be provided in a relatively higher position as shown in FIG. 3 and altered into a lower position by reversing the orientation of the insert as shown in FIG. 4. Having the option of providing the opening in the positions shown provides installation flexibility and may provide some adjustment of sound absorption characteristics propagated from the curb 202. In addition, the wall curb 202 having the insert 231 may provide the installer more installation options due to the increased flexibility of repositioning one or both of the openings 223, 224 and thereby adapting the curb 202 to the geometry of the installation. For example, an installer is provided the ability to change the space between the return and supply air to provide adaptations to differing ceiling heights. In alternate embodiments, the wall curbs 202 of FIGS. 3 and 4 may be formed as a unitary or essentially one-piece construction with the opening 223 formed through the curb and positioned as shown without the invertible insert 231.

FIG. 5 shows a front perspective cutaway view of a HVAC unit 300 mounted to another embodiment of a wall curb 302. The housing 303 of the HVAC unit includes top and bottom panels 307, 308. A front panel 304 and left and right side panels (not shown) generally complete the housing 303 with a back panel 326. The back panel 326 includes a supply opening 327 in communication with a supply opening 319 of the curb 302. Airflow from the supply opening 327 passes through the curb supply opening 319 in a straight line.

Return air enters the curb 302 through curb lower return opening 324 or in an alternate embodiment through a curb upper return opening (see 523 in FIG. 8, discussed below). After entering lower return curb opening 324, return air is drawn into return plenum 318 and turns vertically inwardly. Return air in the return air plenum 318 is separated from supply air passing through the supply opening 319 by partition 316.

Return air then turns horizontally into return unit opening 325 and into the unit 300 for exhaust or reconditioning, for example. Return plenum 318 is lined with sound reduction and/or sound absorption material 328 on one or both of curb 302 front panel inside surface 329 and rear panel inside surface 330. Since the present embodiment is arranged as separate components, the preferred embodiment includes material 328 on panel 330 but not on panel 329. In an alternate embodiment, the supply plenum 317 (see FIG. 6) may also be lined with sound reducing materials (not shown).

Figure 6:
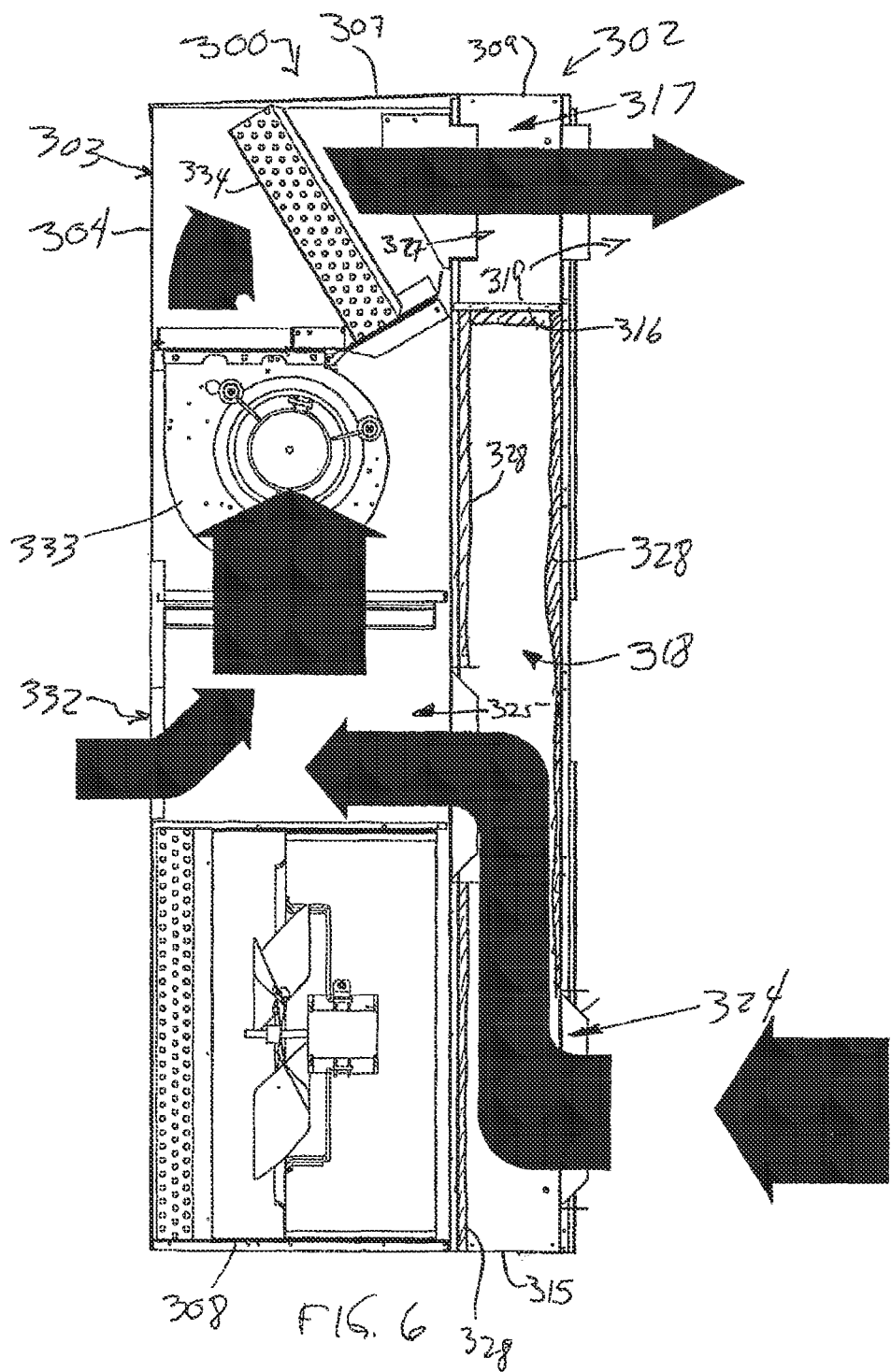
FIG. 6 is side sectional view of the HVAC unit and wall curb of FIG. 5.

FIG. 6 shows the curb 302 of FIG. 5 in a side cutaway view and illustrates airflow through a HVAC unit 300 and attached wall curb 302 according to an embodiment of the present invention. Outside air is brought into the interior of the housing 303 of the HVAC unit 300 through an intake vent 332 or the like. The outside air is drawn in by a blower 333, fan or any suitable air moving device and conveyed through a heat exchange device 334 for conditioning the air, i.e., heating, cooling and/or dehumidifying. Conditioned air leaves the HVAC unit 300 through back panel supply opening 327, passes through the wall curb 302 supply plenum 317 and exits into an adjacent room through curb supply opening 319. It will be understood that the particular operational elements of the HVAC unit will differ according to models, etc. and are all contemplated by the invention when coupled with the sound reducing plenum of the illustrated curb and any equivalents.

Return air enters the wall curb 302 through lower return curb opening 324 and enters return plenum 318. Supply plenum 317 is separated from return plenum 318 by partition 316. The interior surfaces of return plenum 318 are lined with a sound absorbing material 328. Return air is forced into an indirect path from curb lower return opening 324, through return plenum 318 and into unit return opening 325. Due to the return plenum 318 and the sound absorbing material 328 therein, noise and vibration generated by the HVAC unit and air moving therethrough is reduced.

FIG. 7 shows an embodiment of the present invention referred to above, namely, wherein the HVAC unit 400 and wall curb 402 portions are provided in an integrated form. The return opening shown in a lower portion of the curb in FIG. 6 is positioned relatively closer, in the embodiment of FIG. 7, to the supply opening, although the indirect airflow path is retained in an inverted configuration. Returning to FIG. 7 a wall mount housing 403 is provided to house both HVAC portions 400 and sound reducing curb portion 402. The wall mount housing 403 includes a top panel 407, a rear panel 430, and a right side panel 406 with an access panel 444. Not shown are front, left and bottom panels.

The rear panel 430 includes a supply opening 419 positioned adjacent the top panel 407 to supply conditioned air to a building and a return opening 423 for drawing air from the building. Housing 403 may be installed using flanges 413.

Figure 8:
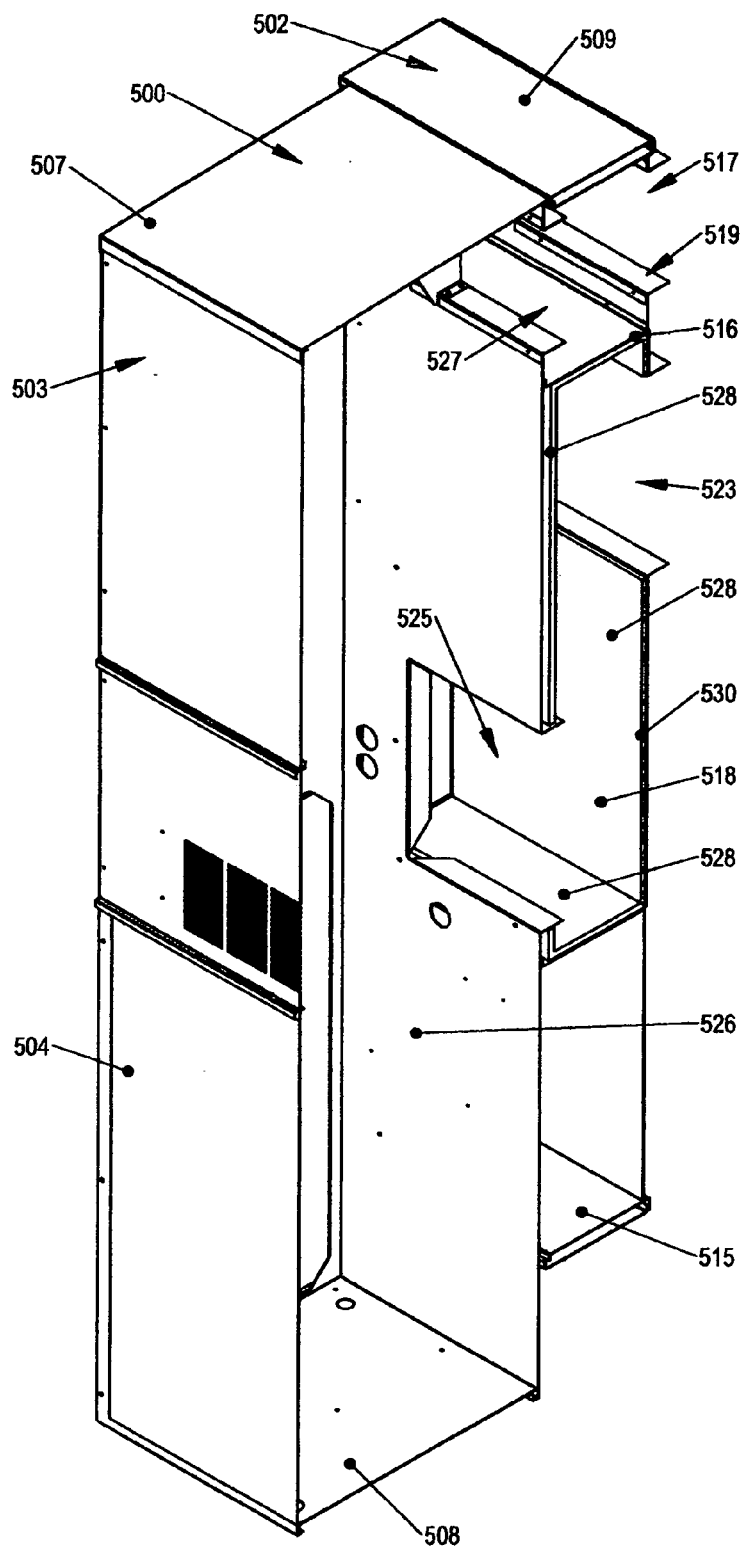
FIG. 8 is a cutaway perspective view of a HVAC unit and yet another embodiment of a wall curb according to the invention.
Figure 9:
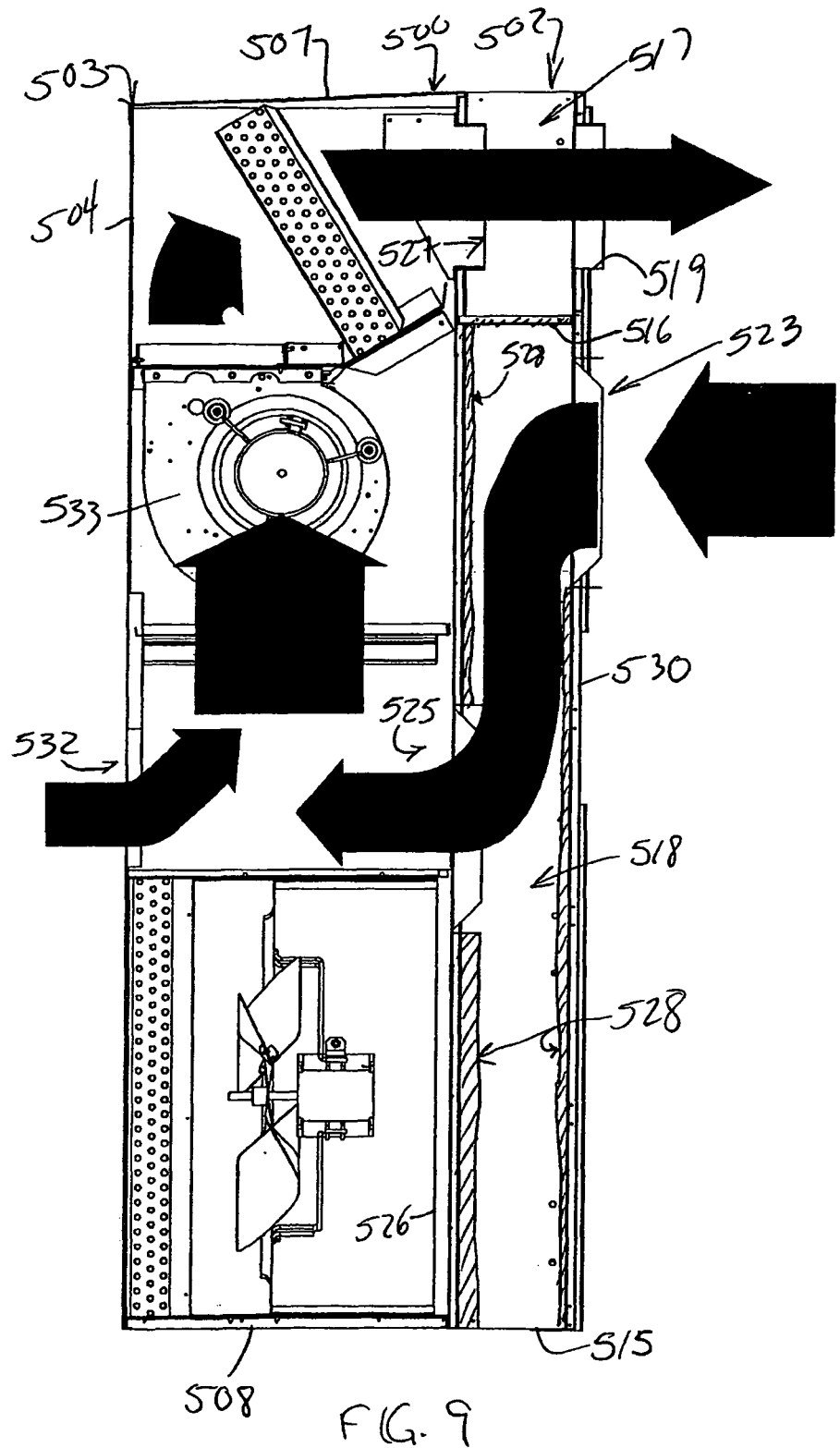
FIG. 9 is a side sectional view of the HVAC unit and the wall curb of FIG. 8.

FIG. 8-11 shows a HVAC unit 500 and wall curb 502. FIG. 8 is shown as a generally two-piece arrangement; however, any of the above and below illustrated embodiments may be constructed in two or more main sections or in a single housing. The panels making up housing 503 of unit 500 include top panel 507, front panel or grill 504 and back panel 526 with bottom panel 508. Left and right panels are not shown. A return opening 525 is formed in a generally central area of the rear panel 526 of unit 500. A supply opening 527 is formed generally at a top area of the rear panel 526 for the exit of supply air from the unit 500. Unit 500 includes most or all of the operating mechanisms of the HVAC unit.

Unit 500 is attached to wall curb 502. A curb top panel 509 is positioned adjacent top panel 507. Curb bottom panel 515 is positioned near bottom panel 508. Curb rear panel 530 is formed parallel to and spaced from unit rear panel 526 to define a curb interior including supply plenum 517 and return plenum 518. Supply plenum 517 and return plenum 518 are separated in curb 502 by partition 516. Return plenum 518 is provided with sound absorbing material 528.

Return air enters return plenum 518 by way of curb upper return opening 523, and enters return opening 525 for processing in unit 500. Supply air exits unit 500 by way of supply opening 527 passes through supply plenum 517 and exits curb 502 via curb supply opening 519. Airflow through the unit 500 and curb may be effected, at least in part, by blower 533 (see FIG. 9).

Figure 10:
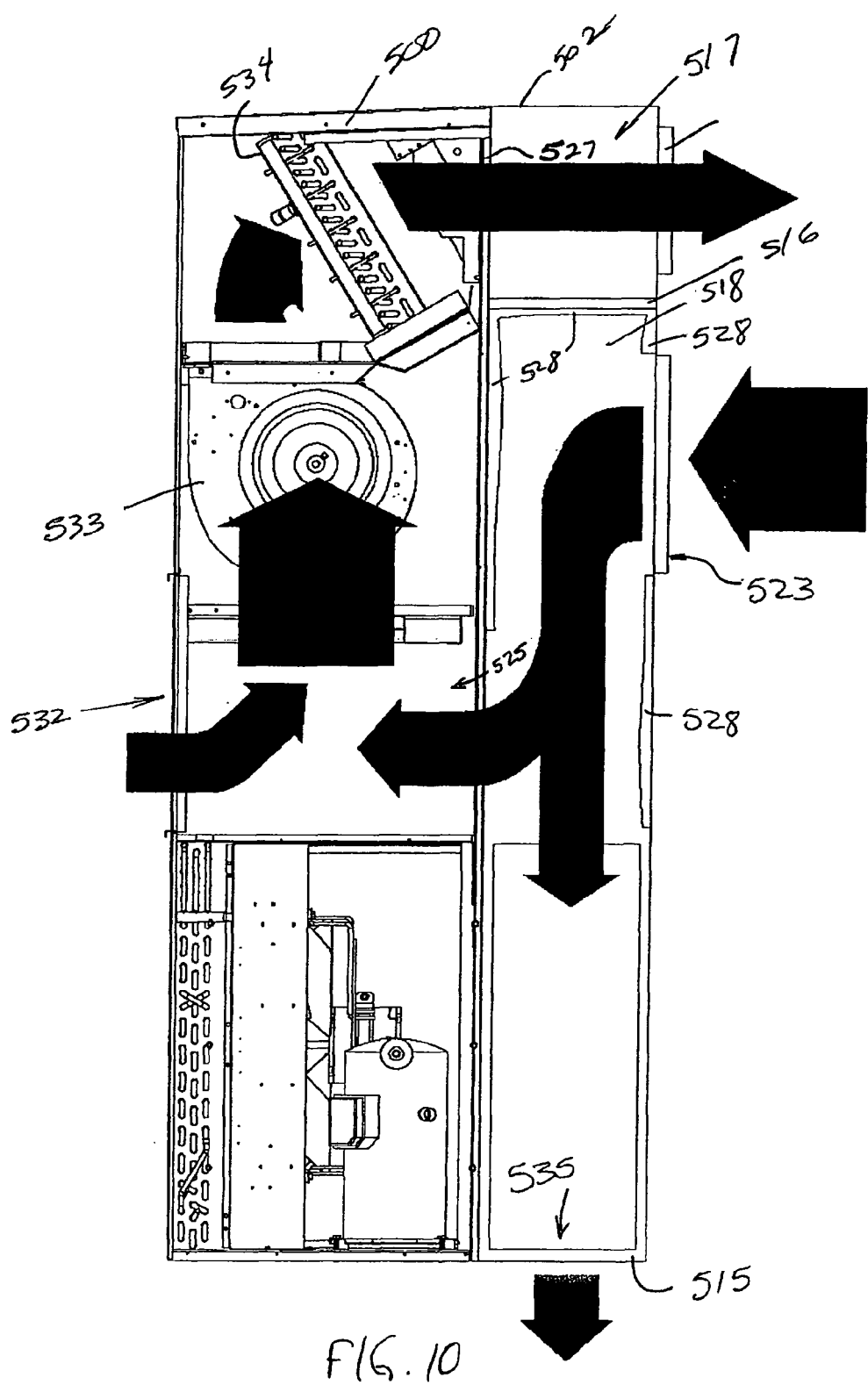
FIG. 10 is a side sectional view of an HVAC unit and yet another embodiment of a wall curb.

In an alternate embodiment, the wall curb 502 may include an exhaust vent 535 formed in the lower section adjacent bottom panel 515 of the curb (see FIG. 10). An amount of return air may then be exhausted from the return plenum 518 by way of the exhaust vent 535.

Figure 11:
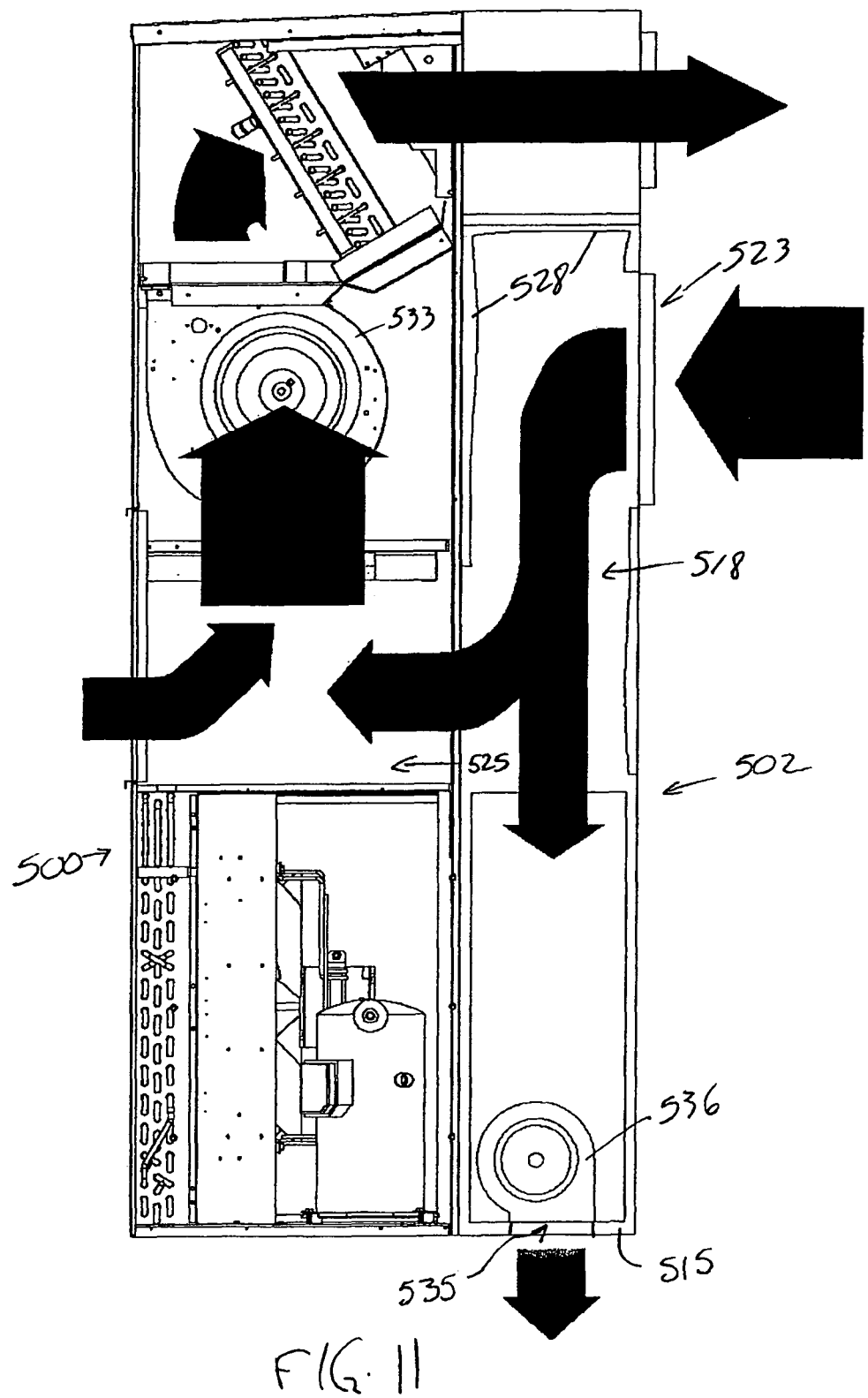
FIG. 11 is an alternate embodiment of the wall curb of FIG. 10.

In the embodiment shown in FIG. 11, an exhaust blower 536 may be positioned on the bottom panel 515 of wall curb 502 within the bottom of the return plenum 518. Return air entering the return plenum 518 may be divided between being exhausted from the wall curb 502 through exhaust vent 535 through operation of the exhaust blower 536 and entering return opening 525 of the unit 500. Altering the speed of the exhaust blower 536 can provide differing proportions of return air exiting the exhaust vent 535 and return air entering the unit 500 through opening 525. Of course, if the exhaust blower 536 is turned off, all of the air entering return plenum 518 enters the unit 500 via opening 525 and may be re-circulated by blower 533.

Figure 12:
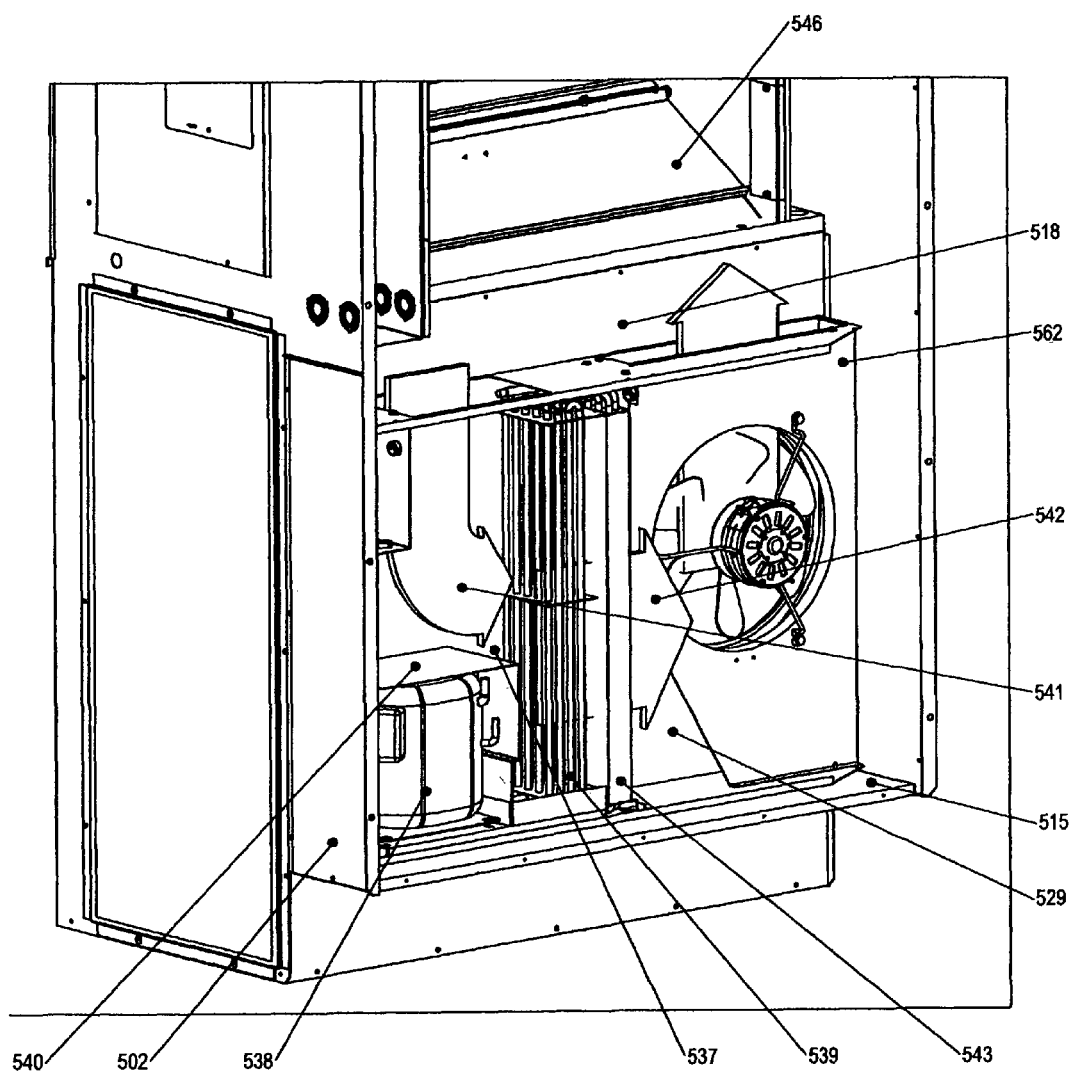
FIG. 12 is a cutaway perspective view of yet another embodiment of a HVAC unit and integrated sound reduction plenum according to the present invention.
Figure 13:
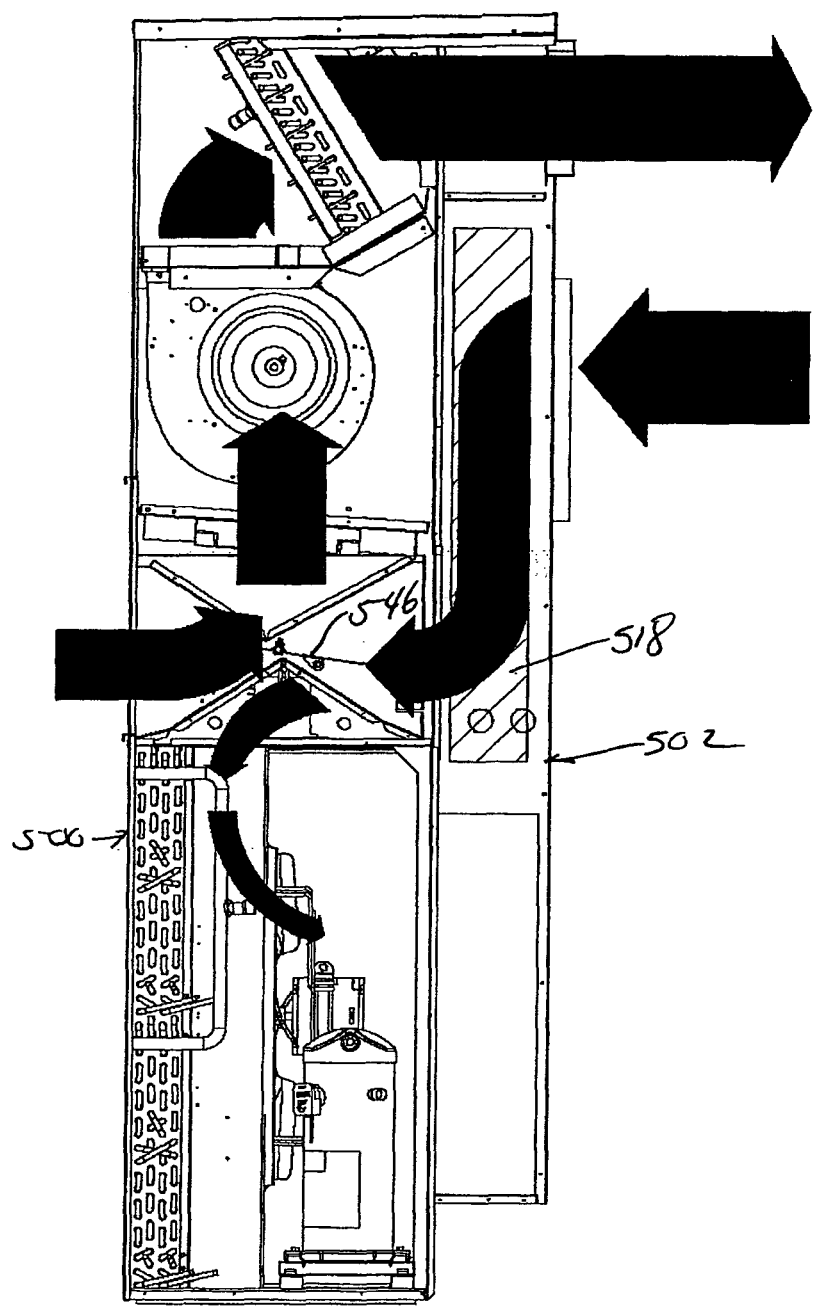
FIG. 13 is a side sectional view of a HVAC unit and another embodiment of a integrated sound reduction plenum according to the present invention.
Figure 14:
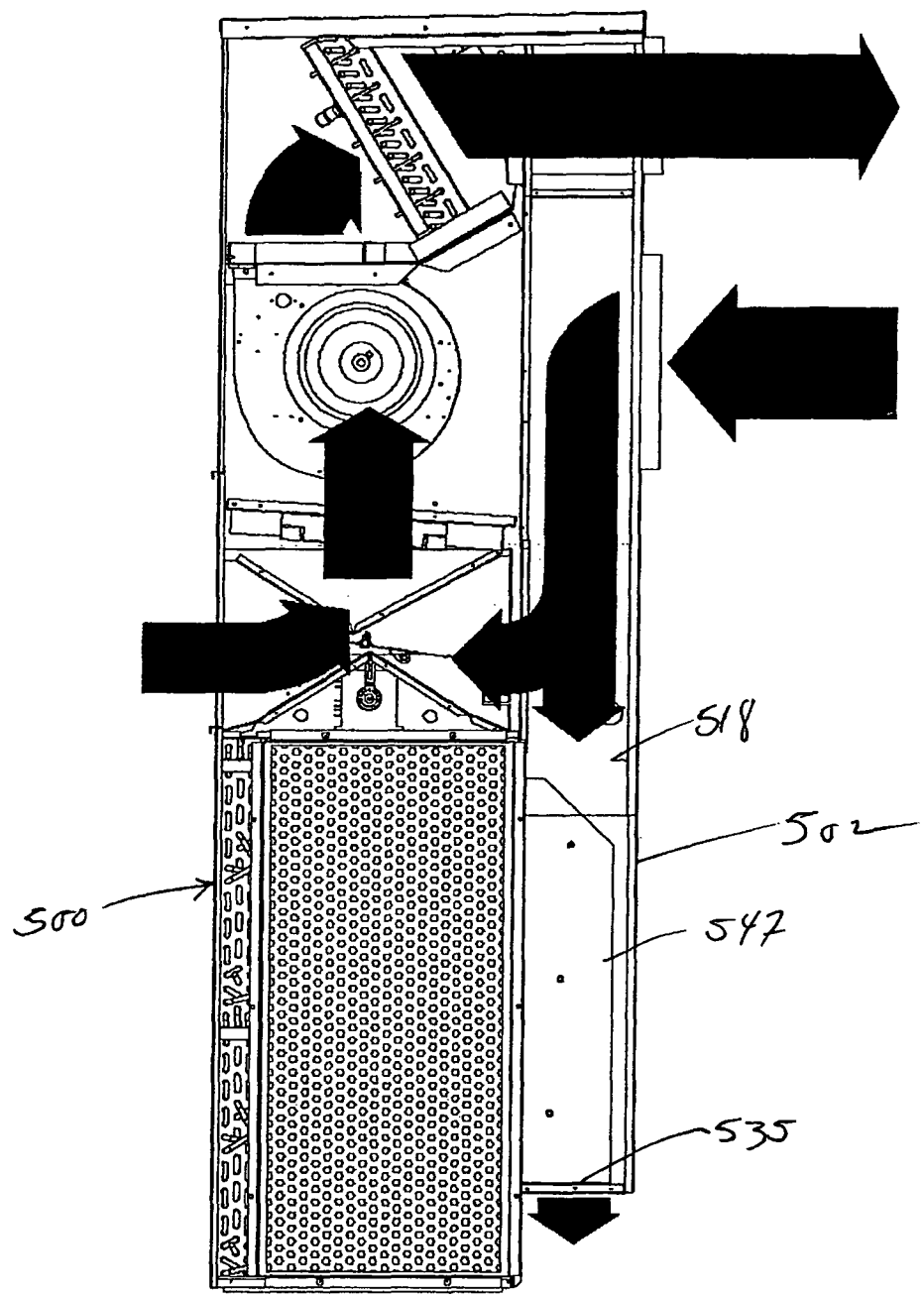
FIG. 14 is a side sectional view of an alternate embodiment of the HVAC unit and integrated sound reduction plenum of FIG. 13.

In the embodiment shown in FIG. 12, a dehumidification system 537 is positioned within a lower portion of the wall curb 502 portion. It will be understood that the wall curb portion 502 is shown as an integrally formed sound reduction plenum in an HVAC unit. The dehumidification system 537 includes a compressor 538 attached to an evaporator coil 539 and condenser coil 543 for dehumidifying return air. To reduce noise propagation, the compressor 538 is preferably enclosed within a separate compressor housing 540. The wall curb portion 502 is defined, (in part) by curb bottom panel 515, curb front panel 529, and curb back panel (not shown). The compressor 538 will preferably be mounted in such as fashion to isolate vibration generated in the compressor from the wall curb 502 and any adjoining structures.

In operation, return air enters an intake side of wall curb 502 return plenum 518, some of which enters sub-chamber 541, in which the coil 539 is positioned. Return air passes over the coil 539 and is dehumidified. After passing through the coil 539, return air passes through passages 542 in condenser coil 543 and into an exit side of the return plenum 518. The dehumidified return air may then be re-circulated, at least in part, into the HVAC 500.

The embodiments illustrated in FIGS. 12-15 and 15A include a conventional unit damper 546. Since the unit 500 includes an integral sound reducing plenum portion, air passing over damper 546 is drawn from the return air plenum 518.

Figure 15:
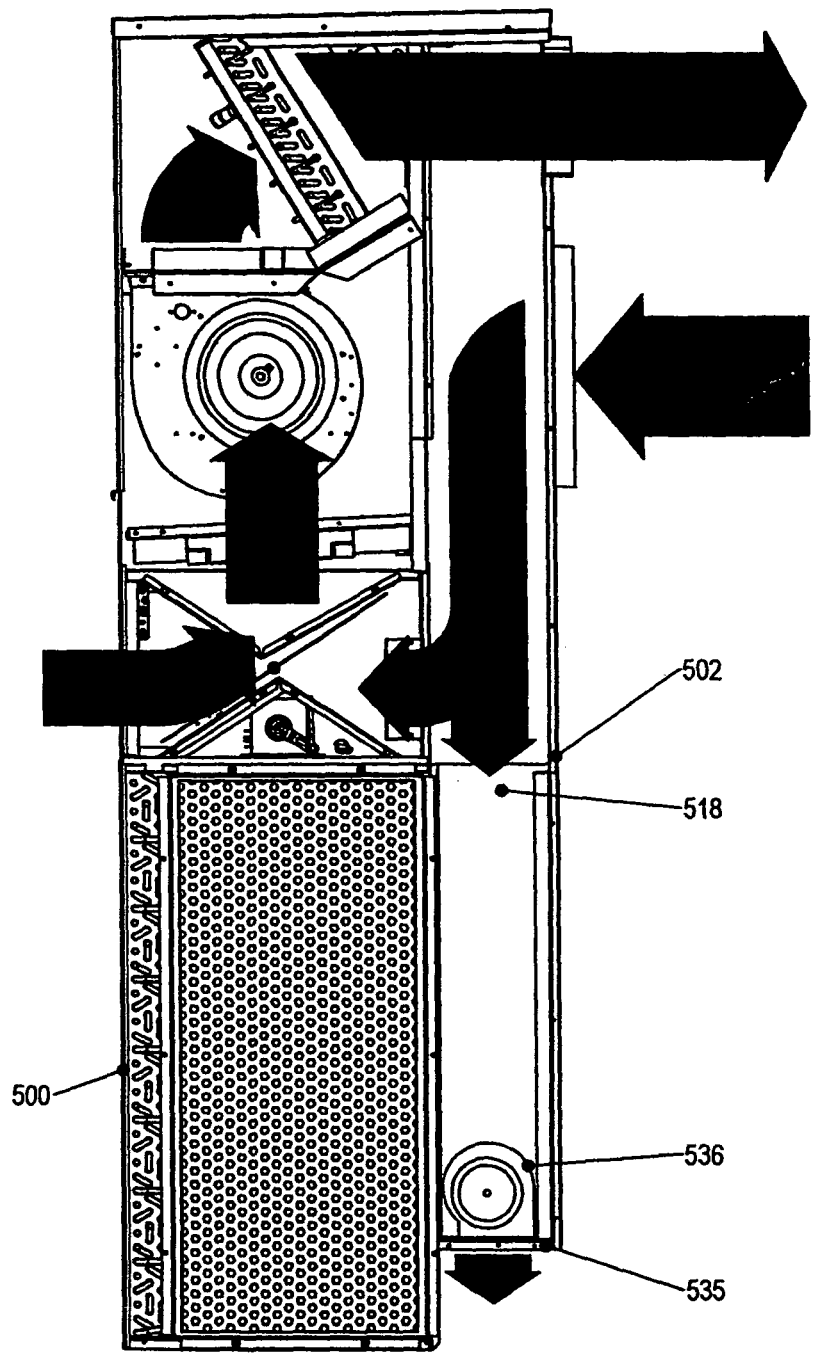
FIG. 15 is a side sectional view of an alternate embodiment of the HVAC unit and integrated sound reduction plenum of FIG. 13.
Figure 15:
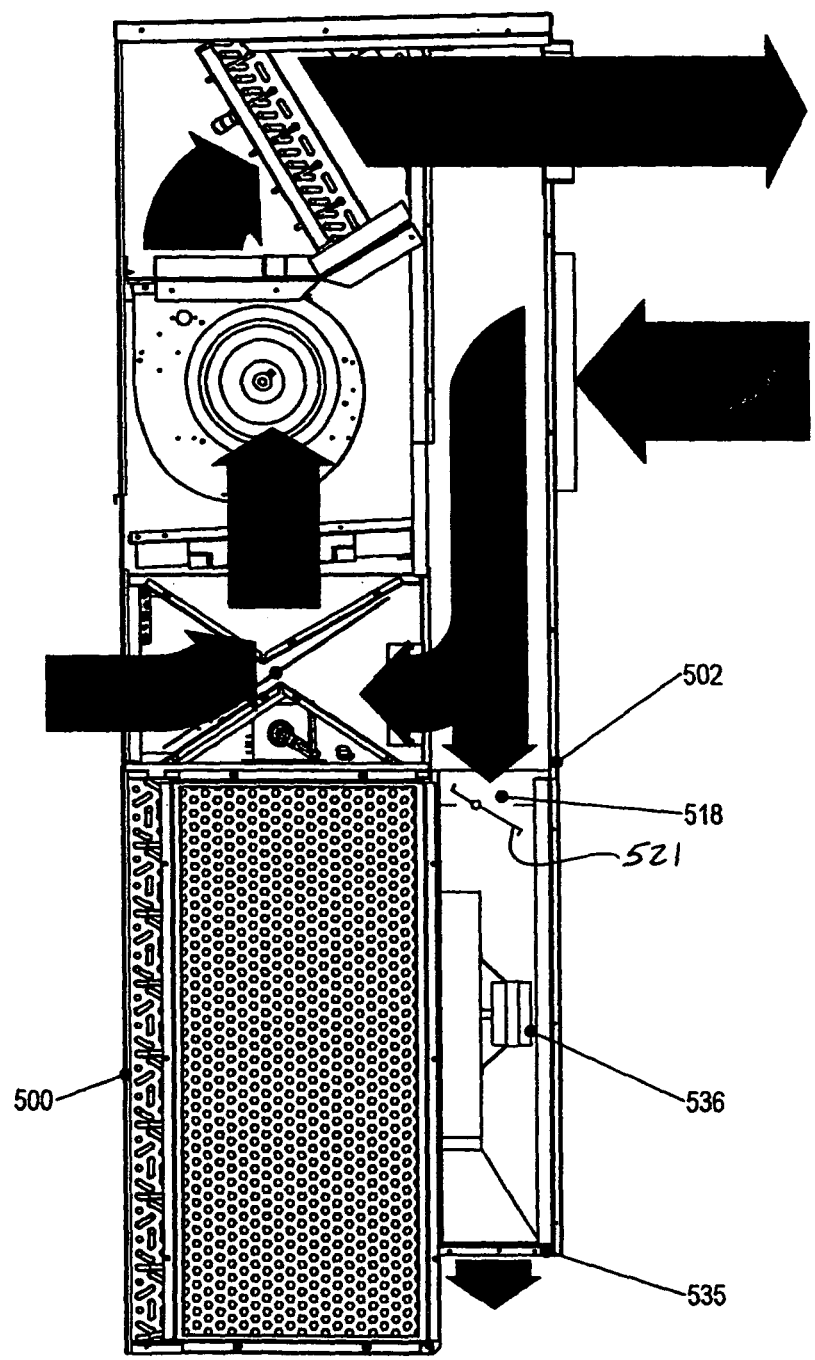

After return air is drawn into unit 500 the damper 546 functions conventionally, i.e., proportions the amount of return air which is reintroduced or re-circulated through the unit verses the amount of air which is exhausted from the curb 502 or the unit. In the embodiment shown in FIG. 13, return air, which is not re-circulated, may be exhausted from the unit, which exhaust, in this example is through vents in the side panels (not shown). In the embodiment shown in FIG. 14, return air, which is not re-circulated, may be exhausted through an exhaust vent 535 formed through the curb bottom panel. The curb 502 may include a damper or other mechanism in the return plenum 518 for controlling airflow through the vent 535. FIG. 15 shows an alternate embodiment of the invention, wherein the exhaust of air from the curb 502 through vent 535 is controlled and/or enhanced by use of a fan or an exhaust blower assembly 536. FIG. 15A shows an alternate exhaust blower 536 configuration. In addition to the exhaust blower assembly 536, a damper 521 may be disposed in a position of the plenum 518 to control airflow therethrough.

Figure 16:
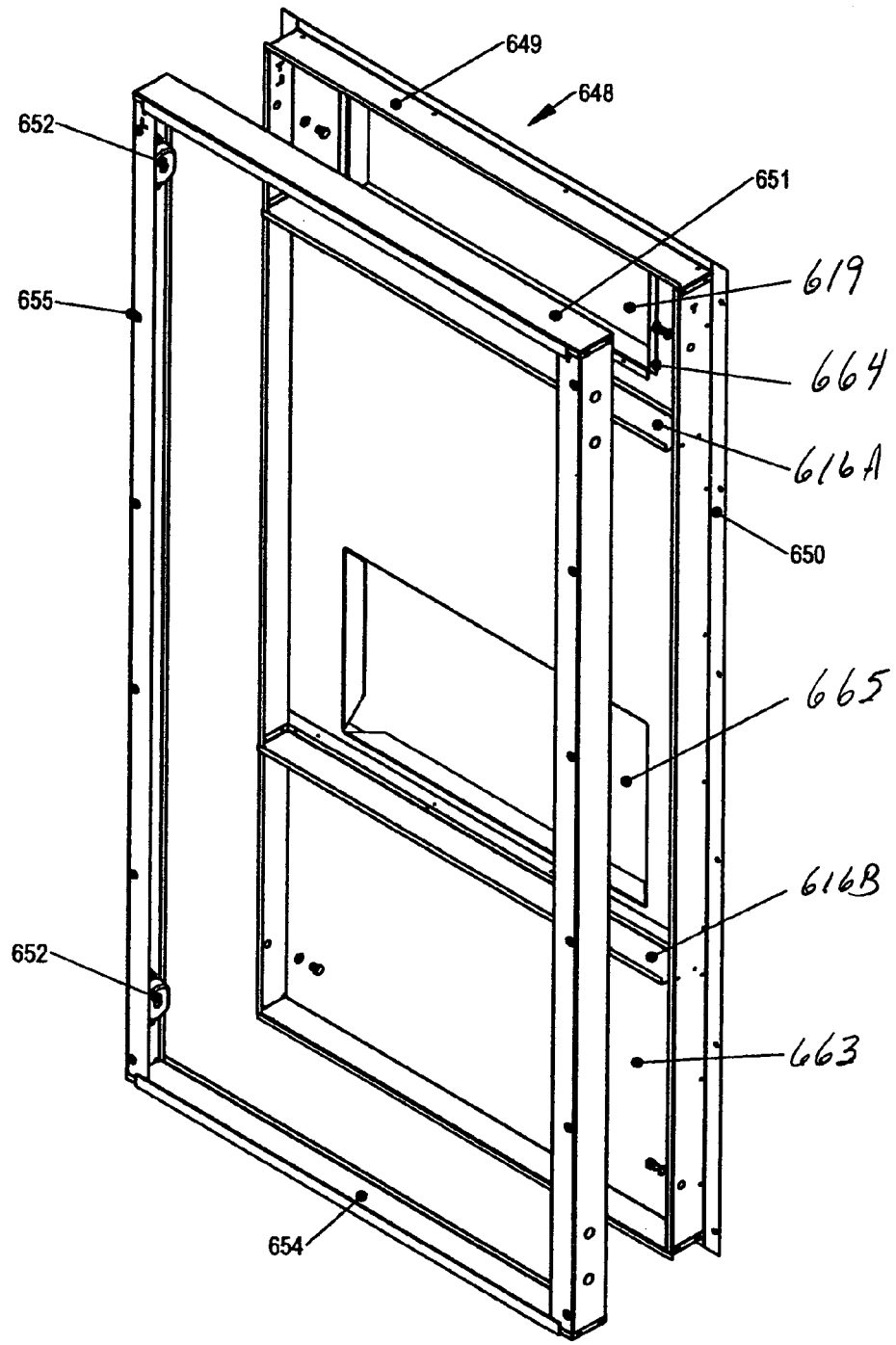
FIG. 16 is an exploded perspective view of a vibration curb for use in attaching a wall mount HVAC unit to a wall.
Figure 16:
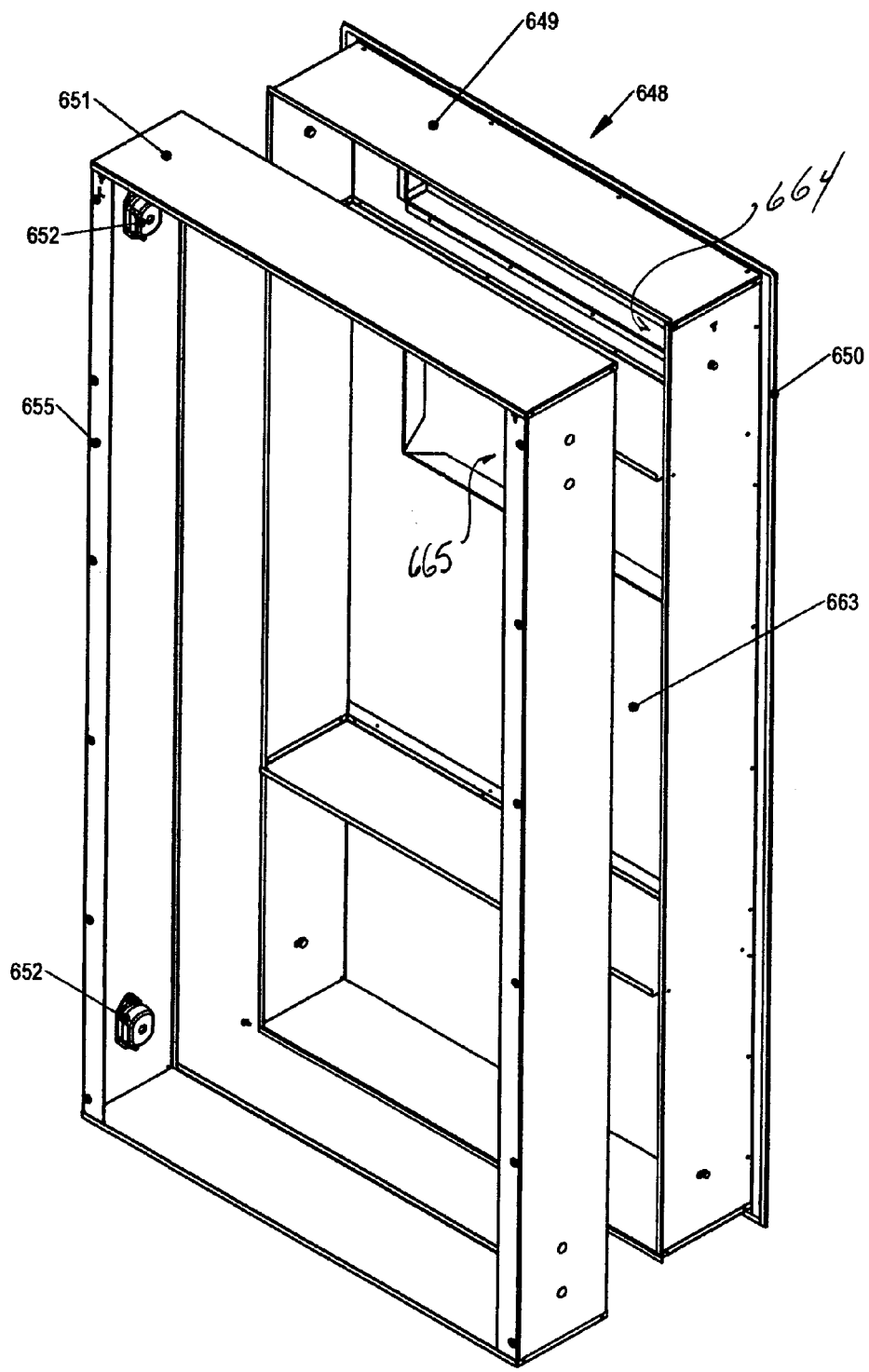
Figure 17:
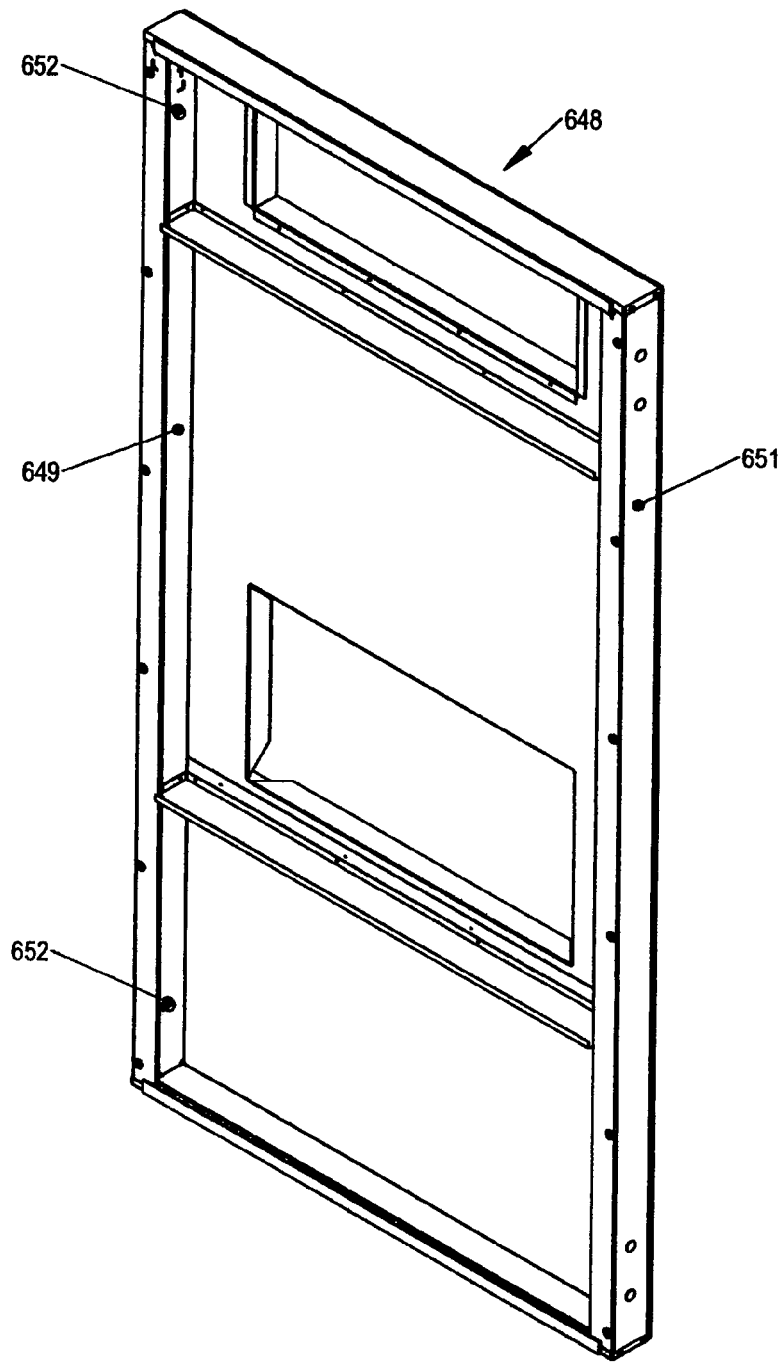
FIG. 17 is an assembled perspective view of the vibration curb of FIG. 16.
Figure 17:
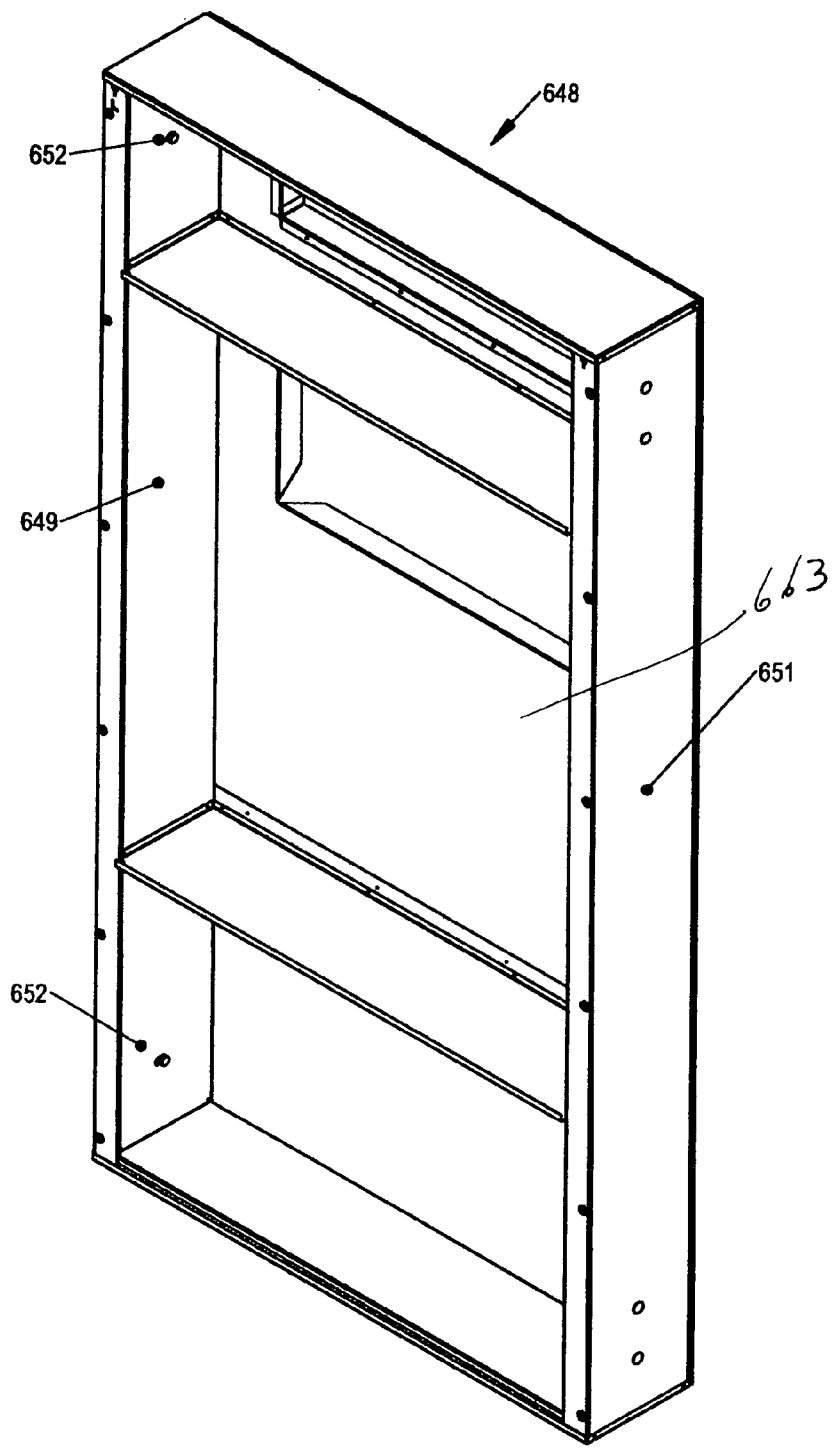
Figure 19:
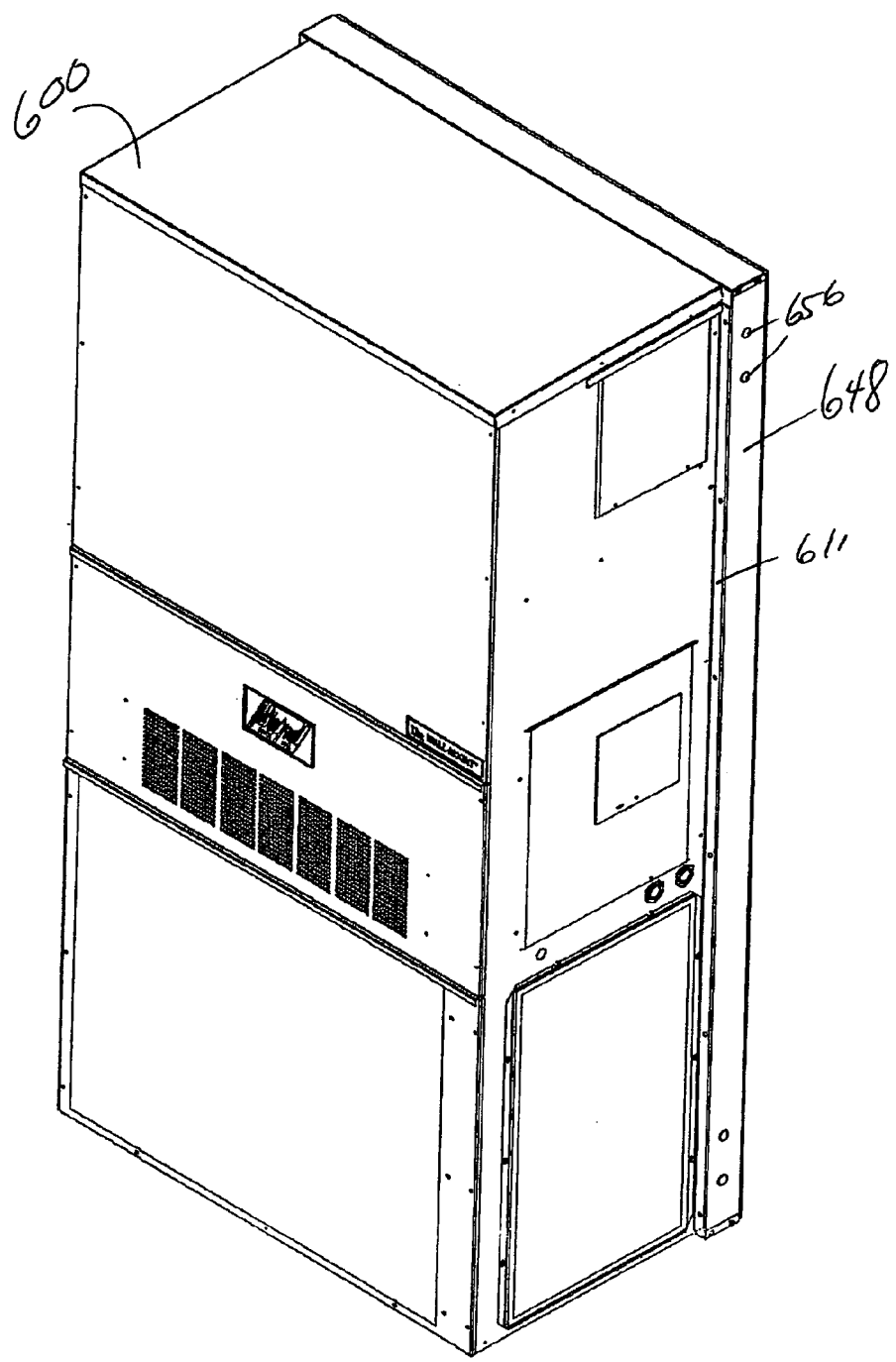
FIG. 19 is a combined wall mount HVAC unit mounted to a vibration curb according to the present invention.
Figure 20:
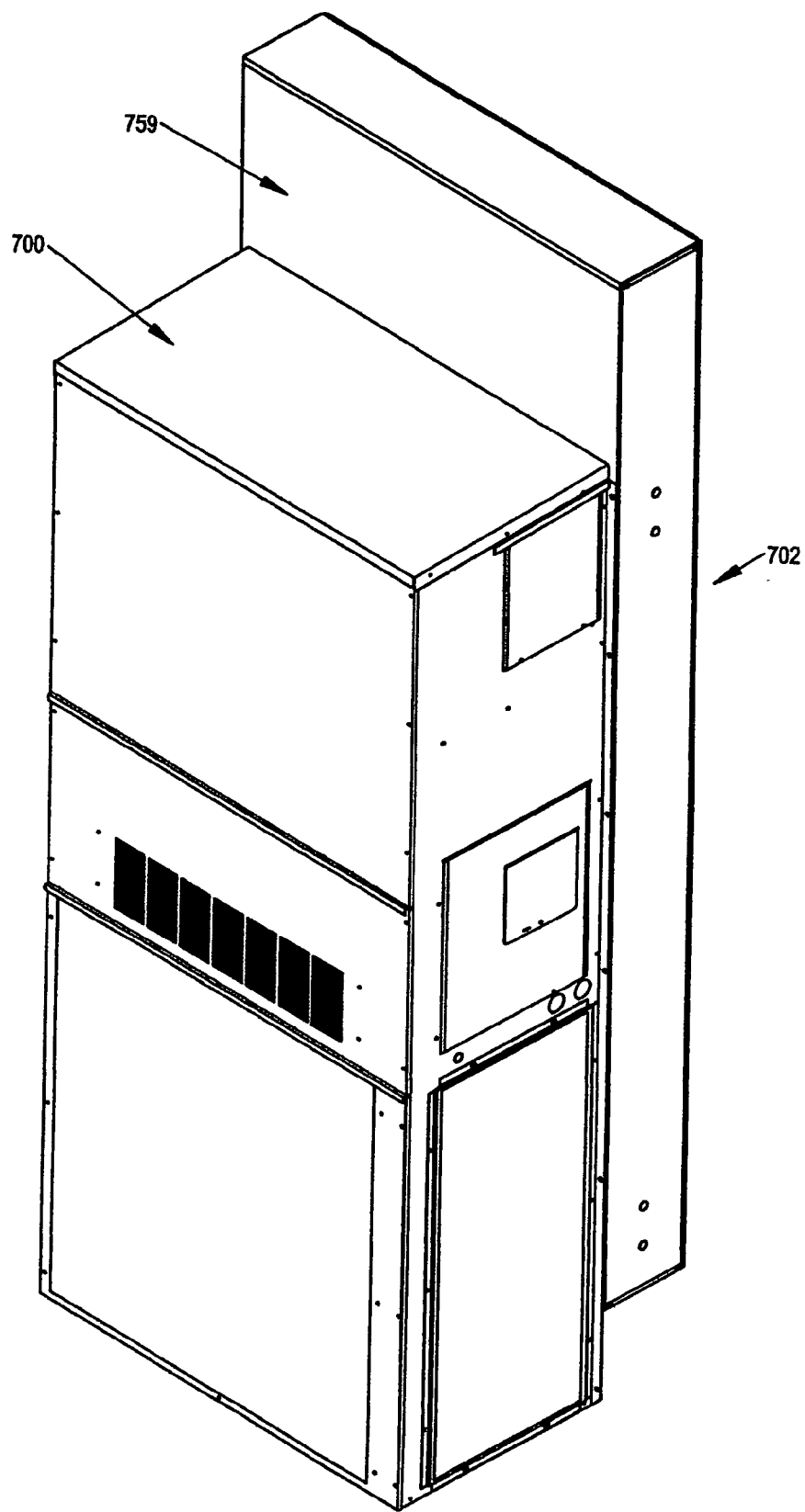
FIG. 20 is a front perspective view of a wall mount HVAC unit and another embodiment of a wall curb according to the present invention.

FIGS. 16 and 16A show embodiments of a vibration curb 648 for use to isolate a wall mount HVAC unit 600 (see FIG. 19) and/or a wall curb 702 (see FIG. 20). The vibration curb of FIGS. 16 and 16A are shown assembled in FIGS. 17 and 17A, respectively. It is advantageous to use a vibration curb with a wood frame wall or any construction that is likely to vibrate. While the vibration curb 648 may be used to isolate an air treatment unit from a brick and mortar wall, it has been found to be more useful in walls constructed in such a manner to have a higher tendency to vibrate, for example, some types of frame construction using wood or metal studs. It will be understood that the vibration curb may be provided with sound reducing material (not shown) in a similar fashion as that of the wall curb described herein.

The vibration curb 648 includes an inner frame 649, which is generally rectangular and is provided with mounting flange and holes 650 for mounting to a wall (not shown). An outer frame 651 is sized and shaped to attach to either a HVAC unit with or without an integrated sound-reducing plenum, or a wall curb, and is sized and shaped to be received on the inner frame 649. A plurality (four, in this embodiment) of vibration isolators 652 is interposed between the inner frame 649 and the outer frame 651. The vibration isolators 652 are preferably elastomeric and function to dampen, absorb or eliminate the transfer of vibrations originating in an attached unit (and alternately transferred through the curb portion) and preventing the vibrations from being transferred to a wall and thence to a building interior. It has been found that isolating a wall mount HVAC unit in this manner reduces noise in an adjoining room.

The inner frame 649 preferably uses wall-mounting holes 650 with spacing identical to those of an existing HVAC unit. Therefore, it is possible to retrofit an existing wall mount HVAC unit with the vibration curb 648 or an existing HVAC unit and wall curb. The outer frame 651 also may include fasteners 655, which may be in the form of cage nuts, weld nuts, weld studs, or other fasteners and the like, for example, provided so as to align with holes (not shown) in an attached unit and isolator mounts (see FIG. 18), which may be in the form of carriage bolts, for example, to attach the vibration isolators 652.

The inner frame 649 includes a back panel 663, preferably provided with insulation. A supply air outlet opening 619 is formed through an upper portion of back panel 663 and may be defined in part by a supply air frame 664. An upper partition 616A may be disposed on the back panel 663 below the supply air frame 664. A return air opening 665 is formed below the upper partition 616A. A lower partition 616B may be disposed on the back panel below the return air opening 665.

FIG. 16A shows an embodiment of a vibration curb, which is similar to that shown in FIG. 16. The vibration curb 648 includes a vibration curb rear panel 663 spanning the entire inner frame 649. An upper supply opening 664 and a return opening 665 are provided through the vibration curb rear panel 663 so as to convey supply and return air, respectively, through the vibration curb 648. FIG. 17A shows the vibration curb of FIG. 16A in an assembled condition.

Figure 18:
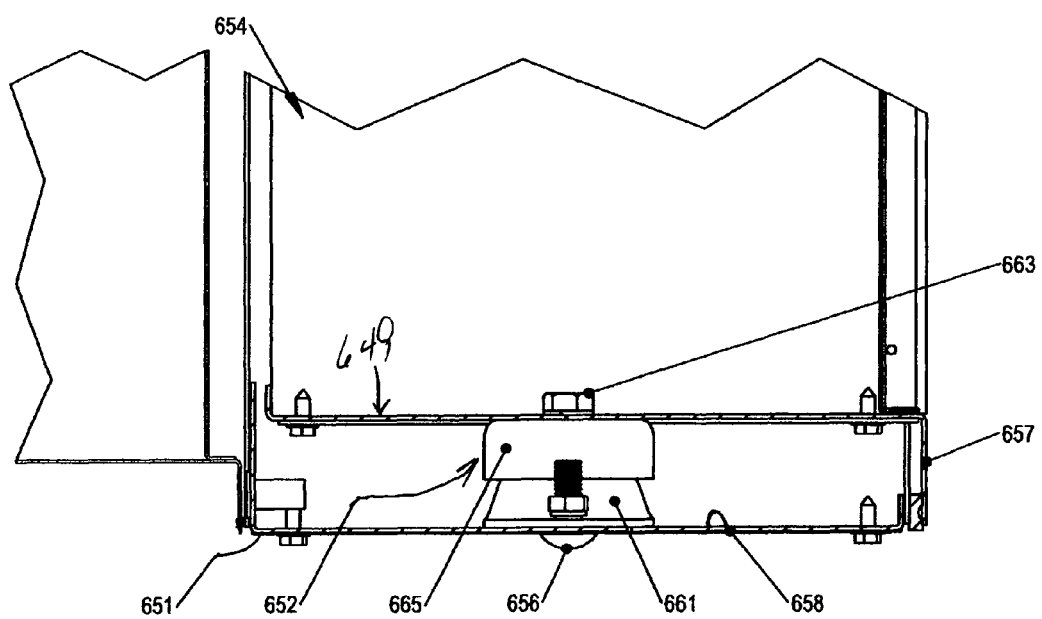
FIG. 18 is a partial detail cutaway view of the vibration curb of FIG. 16.
Figure 18:
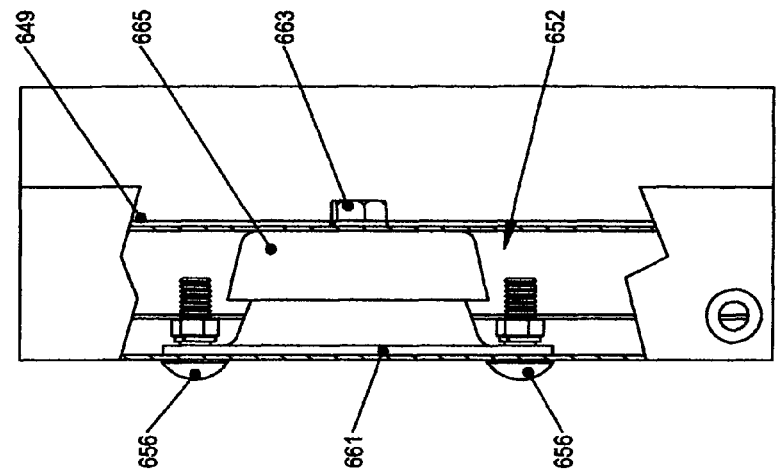
Figure 18:
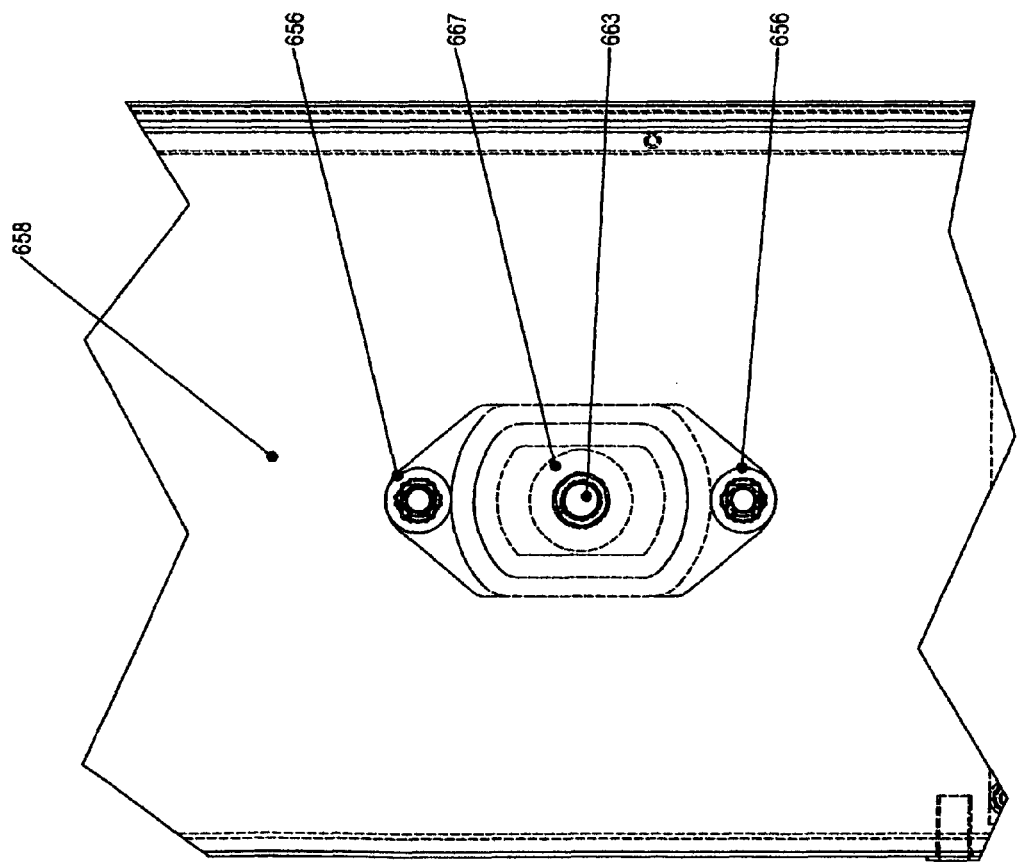

FIGS. 18, 18A and 18B show an embodiment of the attachment method between the inner frame 649 and the outer frame 651 of the vibration curb 648 shown in FIG. 16. In particular, the inner frame 649 includes an inner frame side 657 that is positioned against a wall to which it may be attached (not shown). The outer frame 651 overlaps but is spaced from the inner frame 649 so as to permit the insertion therebetween of a number of vibration isolators 652 (one shown). A pair of carriage bolts 656 or any suitable fastener or fastening mechanisms are passed through the outer frame outer side 658 and through a base portion 661 of the vibration isolator 652. A threaded bolt 663 or other suitable fastener attaches a steel cup portion 665 of the vibration isolator to the inner frame 649. In between the steel cup portion 665 and the base portion 661 of vibration isolator 652 includes an grommet (not shown) for absorbing vibrations. The grommet may be elastomeric, and made of neoprene, for example. The grommet is manufactured so as to be permanently attached to the cap and base (661, 665). The threaded bolt 663 preferably has a rivet 667 or the like, for preventing separation of the base and cup (661, 665) portions of the vibration isolator and ultimately the separation of the inner frame from the outer frame in the event that the elastomeric grommet comes apart. The lip or outer base 654 is shown extending from a lower portion of the outer frame 651.

FIG. 19 shows a vibration curb 648 installed onto a HVAC unit 600. The mounting flange 611 of the unit fits with the outer frame of the vibration curb 648. When so mounted and installed on a building wall, the vibrations generated within the unit 600 are dampened by the vibration isolators 652 fitted between the outer and inner frames (see FIG. 18) of the vibration curb 648.

FIG. 20 shows an air treatment or HVAC unit, generally shown at 700 coupled or detachably attached to an embodiment of a wall curb of the present invention, which is shown generally at 702. The air treatment unit 700 may be a conventional HVAC unit as described in FIG. 1. The air treatment unit 700 is attached to a wall curb 702, which is formed of a rectangular enclosure generally matching that of the unit. The air treatment unit 700 preferably attaches to the wall curb 702 in a reasonably airtight fashion.

A feature of wall curb 702 shown in FIG. 20 is an adapter in the form of an extended portion of the wall curb, generally shown at 759 that permits the HVAC unit 700 to be used with the curb in a pre-existing installation or an installation that has been standardized or configured to receive a standard HVAC unit. Furthermore, the adapter 759 of FIGS. 20-23 permits a HVAC unit 700 to be used in an installation with a roofline or conditions where moving the unit relatively out from the wall would interfere with the facility roof, gutters or other parts of the facility. It will be understood that the adapter, or top outlet box 759, may be formed integral with the wall curb, as in FIG. 20, may be formed integral with a HVAC unit and integrated sound reduction plenum, or may be added to a wall curb or HVAC unit as in FIG. 22, to provide the benefits discussed herein.

To illustrate, existing HVAC units have supply and return openings with a given spacing which is matched by openings in a facility wall to which the unit is attached or is to be attached and will supply conditioned air. The facility also typically has a roofline or other structural elements fixed in place. When a wall curb of the present invention is fitted between the HVAC unit and the wall the HVAC unit is spaced from the wall a distance equal to the depth of the wall curb. Alternately, an integrated HVAC unit designed with a sound reduction plenum according to the present invention will present an increased depth relative to a unit without a sound reduction plenum. Whereas the unit will have cleared any facility structure in an original installation, there may, after the retrofitting of a curb or the like, be interference between the unit and the roof or building structure. The adapter shown in FIGS. 20-23 avoids this potential difficulty by adding an extension or supply plenum extension 759 to the top of the curb 702, or extending the top of the curb section, which in effect lowers the top of the HVAC unit 700 portion by the distance equal to the amount of height provided by the extension.

Figure 21:
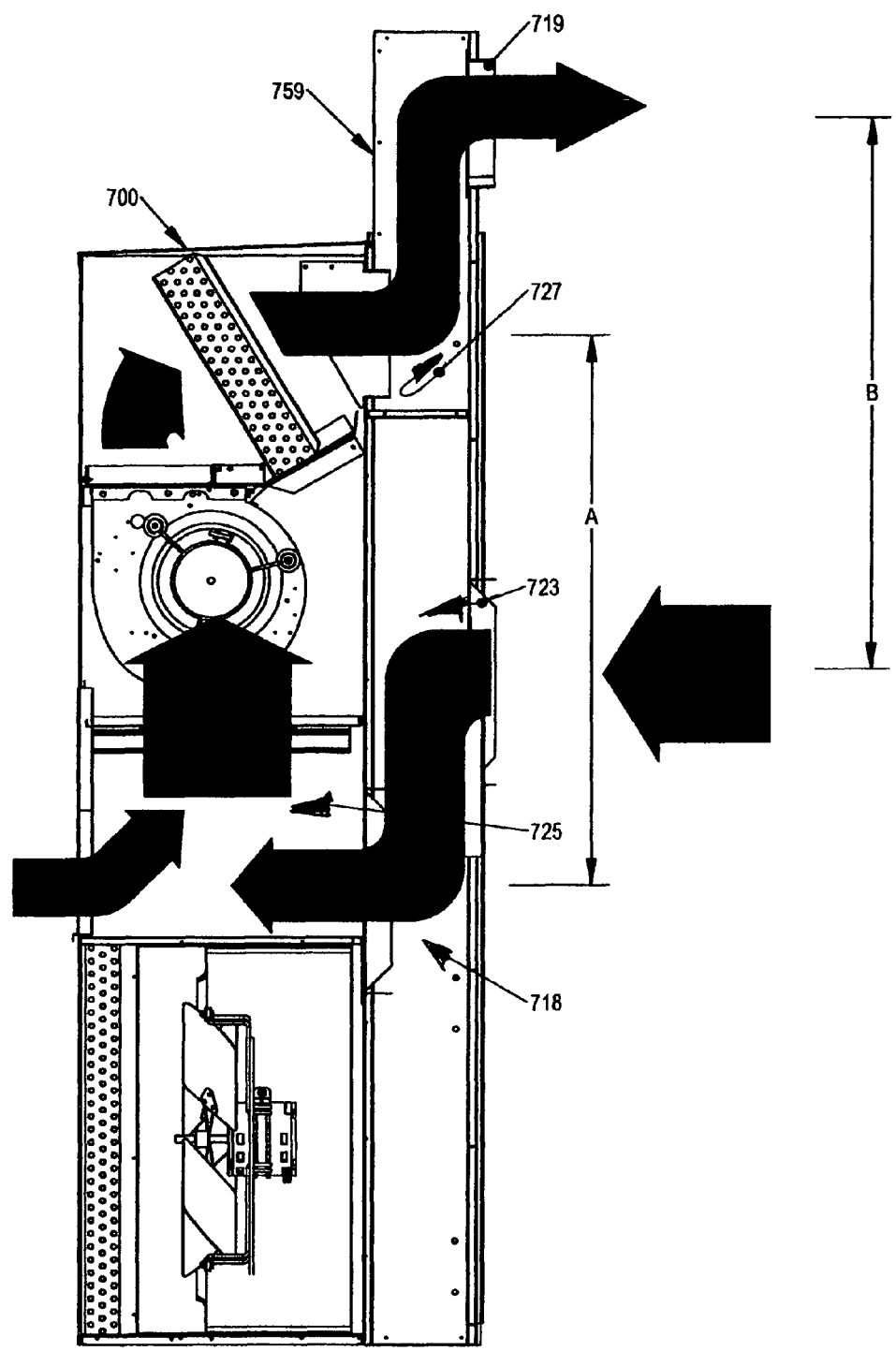
FIG. 21 is a side sectional view of the wall mount HVAC unit and wall curb of FIG. 20.
Figure 22:
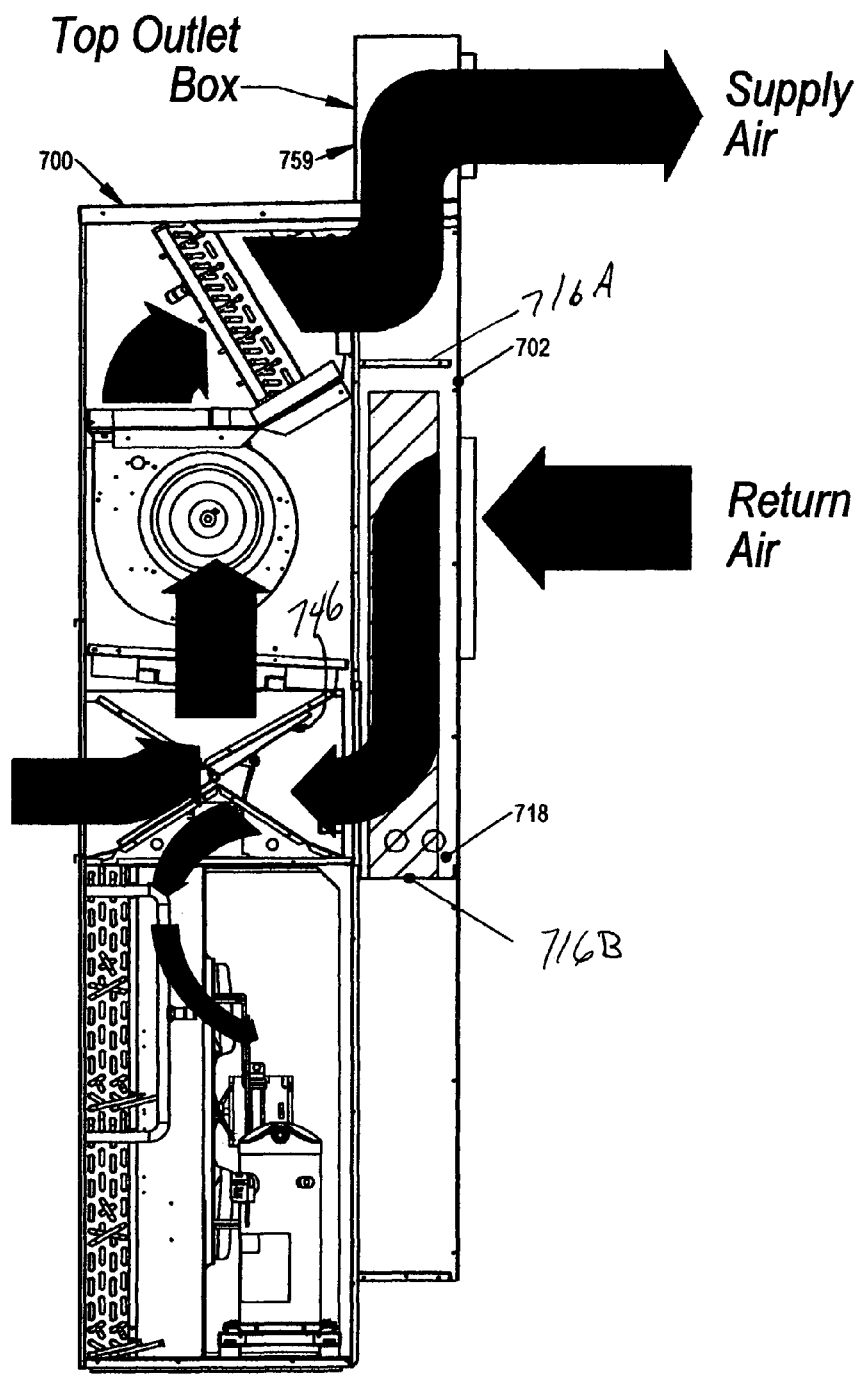
FIG. 22 is a side cutaway view of yet another embodiment of a wall mount HVAC unit and integrated sound reduction plenum.

Returning to FIGS. 20-22, HVAC unit 700 is supplied with curb 702 as described above. It should be noted that the adapter in FIG. 22 is provided as a separate portion or addition of the integrated sound reduction plenum of the wall mount HVAC unit of FIG. 22. The other embodiments (FIGS. 20, 21, and 23) are constructed whereby the adapter is formed as part of the wall curb or may be formed as part of an integrated unit.

Adapter or top outlet box 759 is attached to the top of the curb (FIG. 22) or can be considered an extension of the top of the curb 700. As can be seen in FIG. 21, the distance A between the unit 700 supply opening 727 and return opening 725 is equal to the distance B between the top outlet 759 supply opening 719 and return opening 723. Both of the supply and return air paths are indirect. This is due to the top outlet 759 supply opening 719 being spaced the same amount in the unit 700 and curb 720 and offset the same amount. Thus, the unit 700 avoids interference with any existing roof structure by being relatively lowered.

FIG. 22 illustrates an embodiment of the invention including a damper 746, which has the same structure and function as the damper described above. It will be understood that the separate top outlet box 759 provides an indirect path for supply air similar to the indirect path for return air. The outlet box 759 may be provided with sound absorbing material (not shown) like that provided the return plenum 718. Horizontal partitions, 716A and 716B may be disposed in the curb 702 to define the interior thereof.

Figure 23:
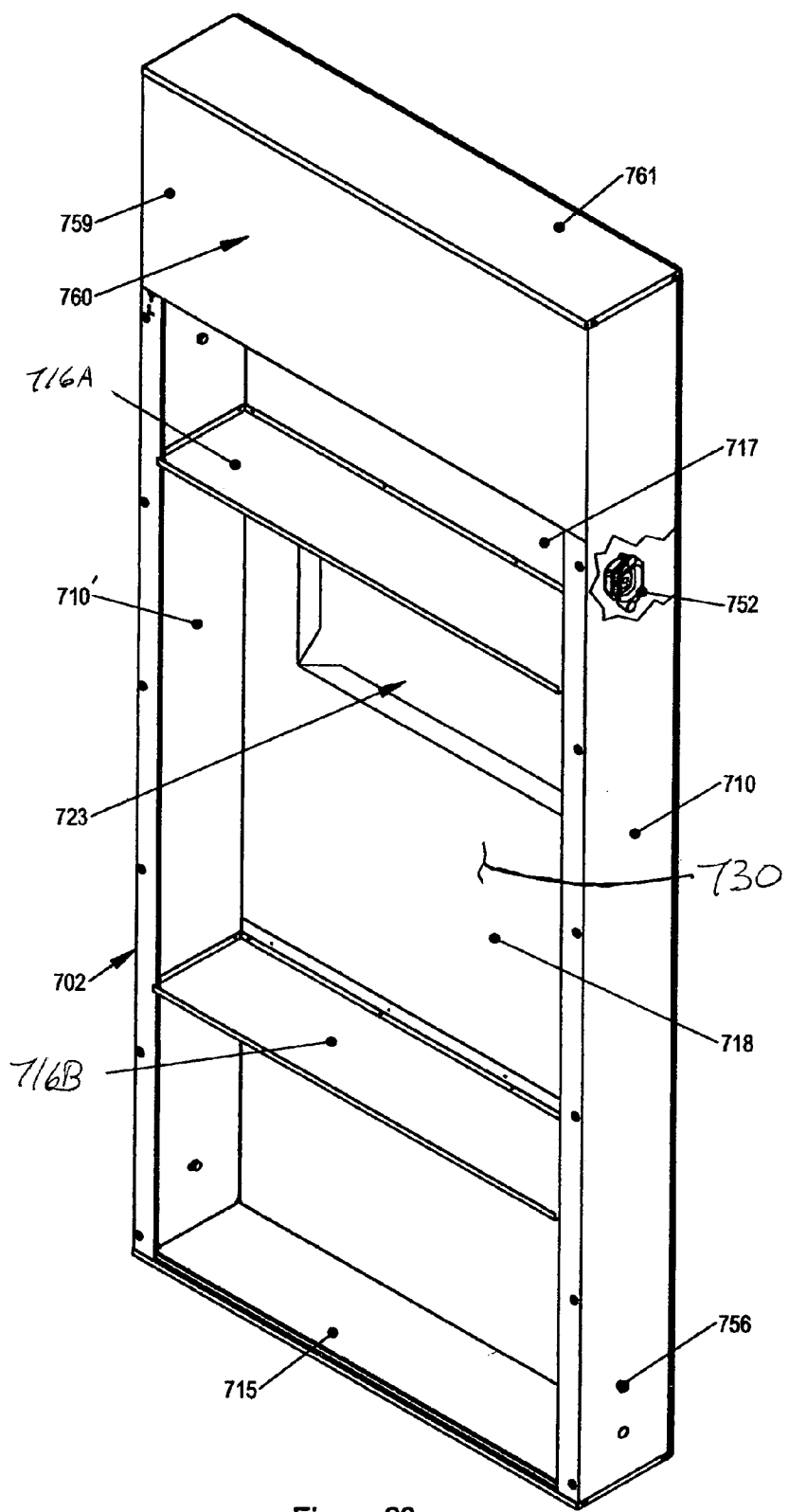
FIG. 23 is a perspective view of a wall curb and vibration curb according to another embodiment of the present invention shown in FIG. 21.

FIG. 23 shows the embodiment of the curb 702 shown in FIGS. 20-22 attached to a vibration curb 748 without an attached HVAC unit. The wall curb 702 includes a bottom panel 715, right and left side panels 710, 710', back panel 730, and horizontal partitions 716A, 716B. Partition 716A divides the interior of the curb 702 into a supply plenum 717 above the partition and a return plenum 718 below the partition. Partition 716B divides the interior of the curb 702 into a return plenum 718 above the partition. The return plenum 718 includes a return opening 723. The supply plenum 717 is defined in part by partition 716A, right and left sidewalls 710, 710', and top outlet box 759. The top outlet box 759 is defined in part by top outlet box front panel 760 and top outlet box top panel 761.

The vibration curb 748 is attached to a wall (not shown) and the wall curb 702 is attached to the vibration curb. A plurality of vibration isolators 752 are held in position by fasteners 756 and interposed between the vibration curb 748 and the wall curb 702.

Figure 24:
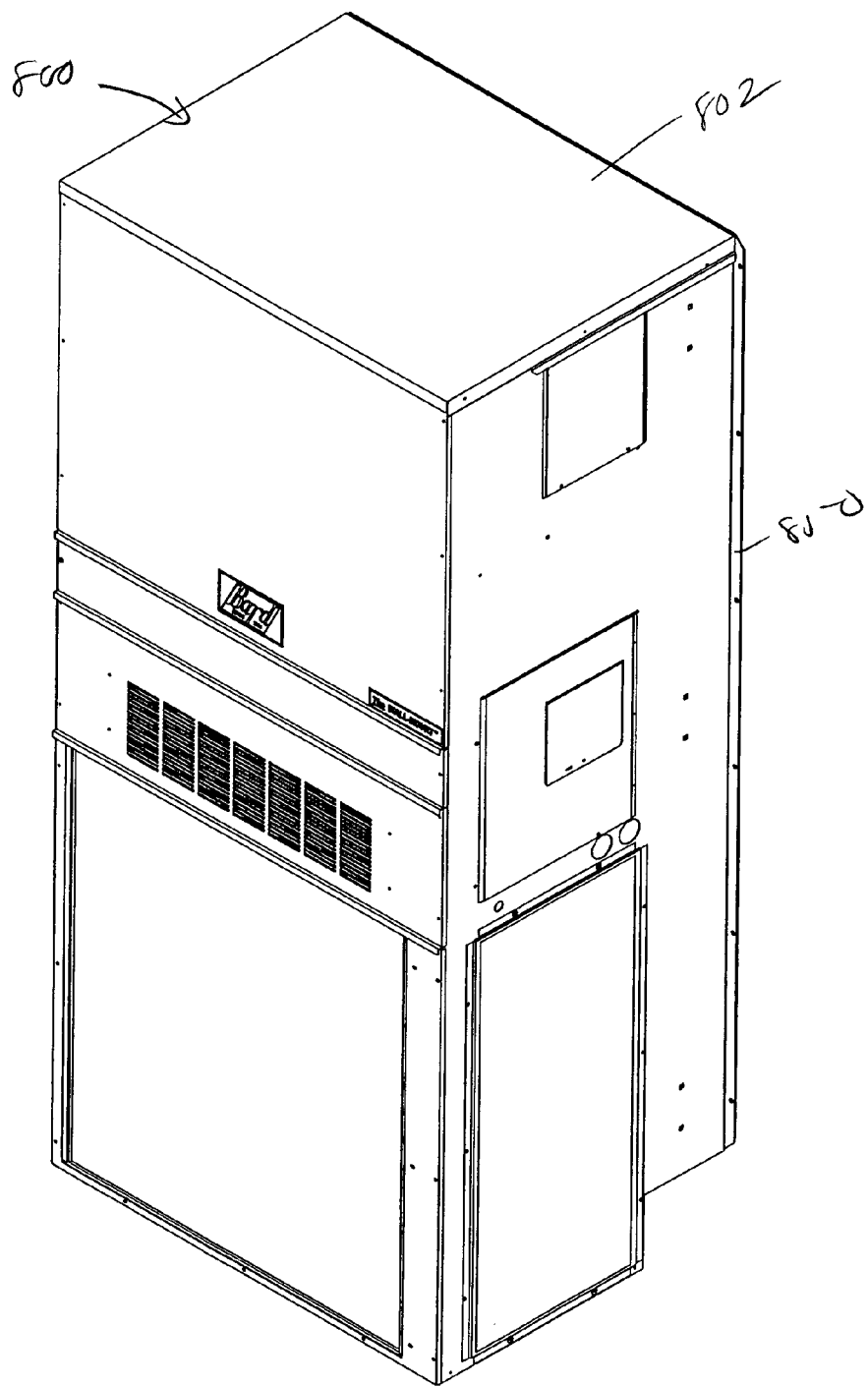
FIG. 24 is a perspective view of a wall mount HVAC unit according to one embodiment of the present invention including an integrated sound reduction plenum and vibration curb.
Figure 25:
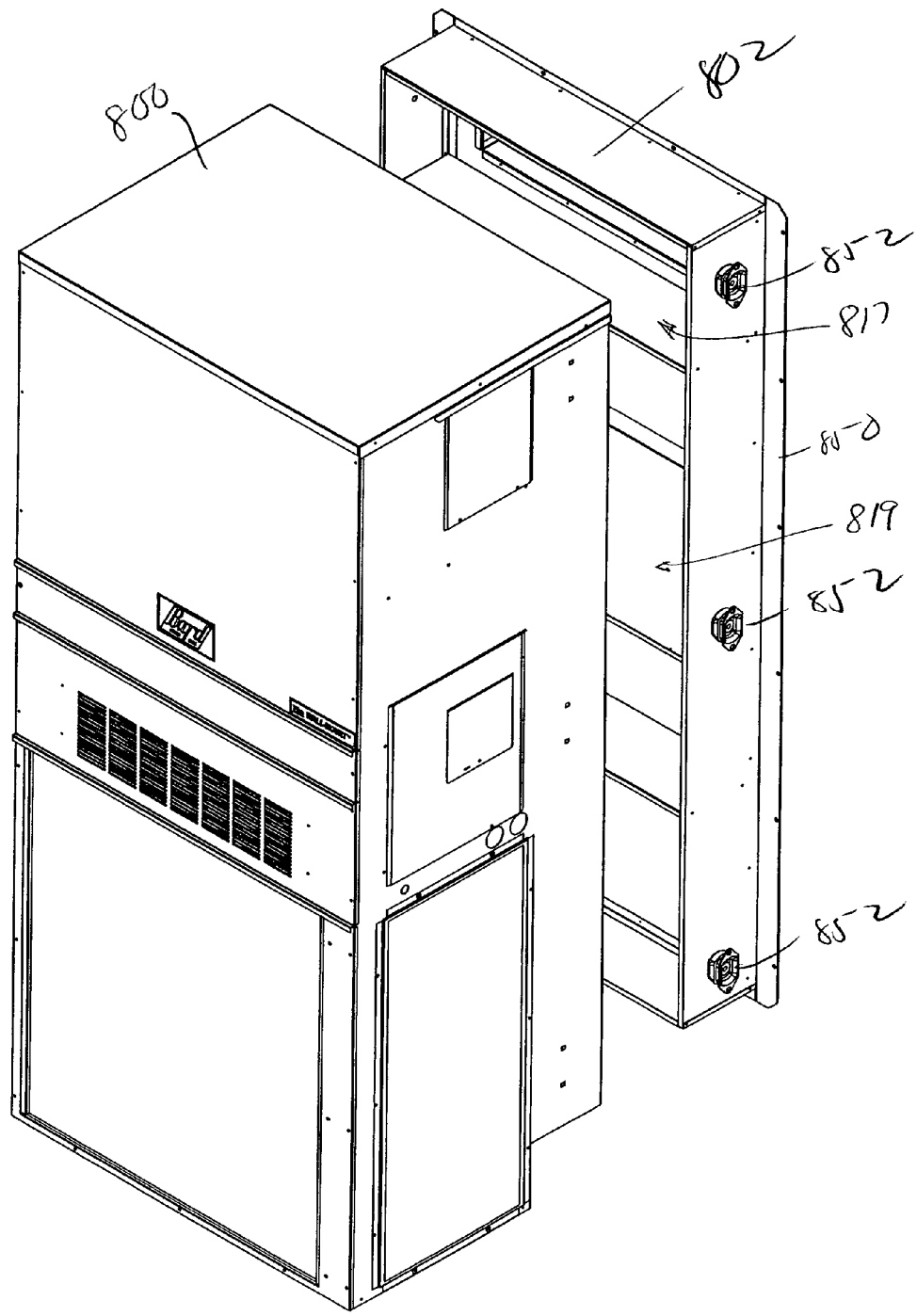
FIG. 25 is an expanded view of the unit of FIG. 24.
Figure 26:
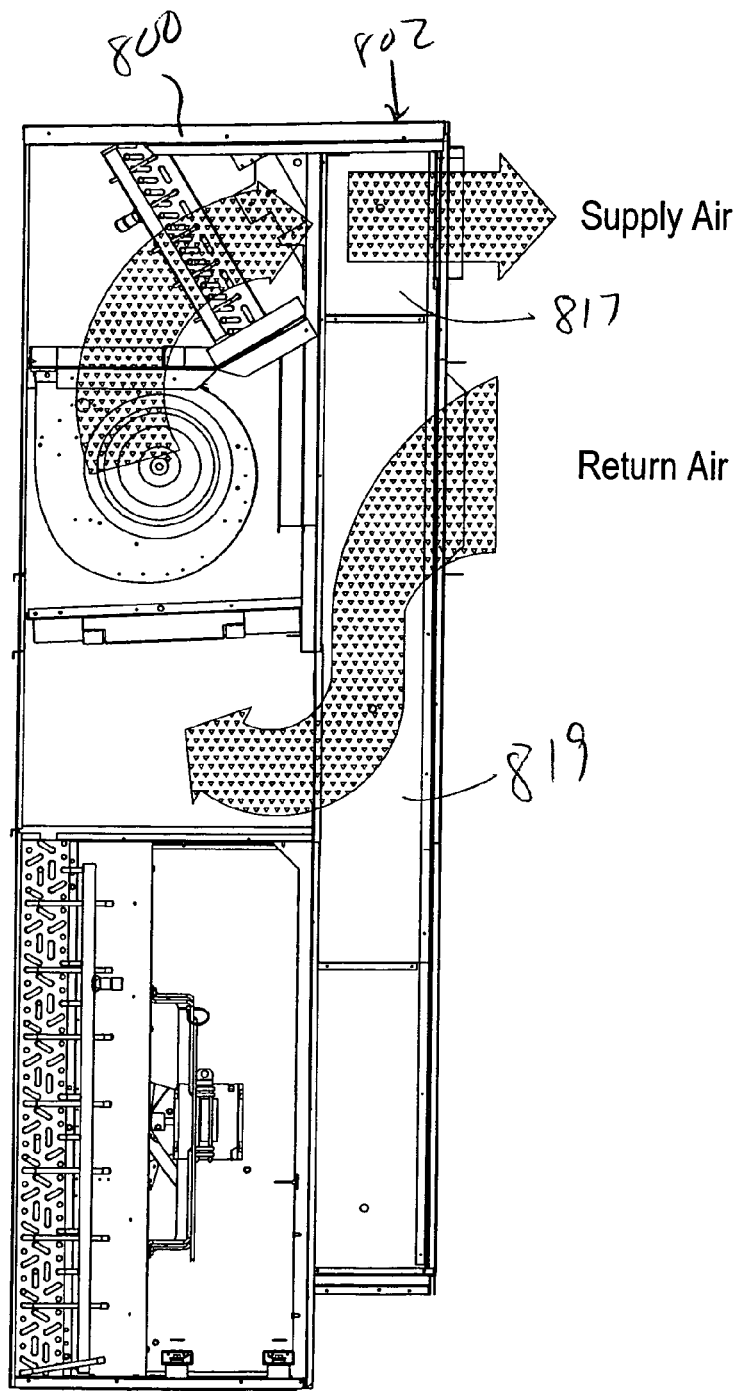
FIG. 26 is a sectional view of the unit of FIG. 24.

FIGS. 24-26 show an integrated HVAC unit 800 according to one embodiment of the invention. The operative aspects of the unit 800 are disposed within the unit including a portion with a sound reduction plenum 802 and isolation members 852. Unit 800 is attachable to an installation by way of mounting flange and holes 850. The plenum 802 (shown in more detail in FIG. 25), includes a plurality of isolation members 852 that, when the plenum section 802 is inserted into unit 800, function to dampen and absorb vibrations between the unit and plenum and reduce transmission of vibrations into the installation.

The unit 800 functions and has similarity to many of the preceding embodiments, including a supply plenum 817 and return plenum 819. It will be understood that in the depicted embodiment of FIGS. 24-26, the HVAC, sound reduction function and vibration isolation elements are embodied in a single, unitary construct.

While the present invention has been described and illustrated with reference to specific embodiments, those skilled in the art will recognize that modifications and variations may be made without departing from the principles of the present invention as described hereinabove and set forth in the following claims.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

What is claimed is:

1. An air treatment unit with an integrated sound reducing plenum, comprising:
   a unit housing including opposed front and back panels, spaced apart longitudinal side panels and opposed bottom and top panels;
   a unit supply opening formed in said back panel;
   a unit return opening formed in said back panel and spaced from said unit supply opening a first distance;
   a curb frame including a curb back panel, spaced apart longitudinal curb side panels and opposed curb bottom and curb top panels defining an interior chamber;
   a partition extending between said longitudinal curb side panels and defining with said curb frame a supply plenum in an upper portion of said interior chamber in communication with said unit supply opening and a return plenum in a lower portion of said interior chamber in communication with said unit return opening;
   a curb supply opening formed through said curb back panel in communication with said supply plenum; and
   a curb return opening formed through said curb back panel in communication with said return plenum, wherein said curb return opening is positioned so as to define a non-linear air flow path through said return plenum with said unit return opening so as to reduce the level of noise transmitted therethrough, and further including a sound absorbing material positioned on at least some inside surfaces of said return plenum, and further including a dehumidification mechanism disposed within said return plenum.

2. The air treatment unit with an integrated sound plenum of claim 1, wherein said curb supply opening and said curb return opening is spaced a second distance, said second distance being equal to said first distance.

3. The air treatment unit with an integrated sound plenum of claim 2, wherein said first distance is a vertical distance and said second distance is a vertical distance.

4. The air treatment unit with an integrated sound plenum of claim 1, wherein said curb supply opening is positioned so as to define a non-linear air flow path through said supply plenum with said unit supply opening.

5. The air treatment unit with an integrated sound plenum of claim 1, wherein said curb return opening is positioned in a portion of said back panel adjacent and below said partition.

6. The air treatment unit with an integrated sound plenum of claim 1, wherein said return opening is positioned in a portion of said back panel adjacent and above said bottom panel.

7. The air treatment unit with an integrated sound plenum of claim 6, further including a damper positioned within said return plenum for controlling airflow of return air through said exhaust vent.

8. The air treatment unit with an integrated sound plenum of claim 6, further including an exhaust blower positioned within said return plenum for controlling airflow of return air through said exhaust vent.

9. The air treatment unit with an integrated sound plenum of claim 1, wherein said curb bottom panel includes an exhaust vent.

10. The air treatment unit with an integrated sound plenum of claim 1, wherein said return opening includes a pair of openings formed through said curb back panel, a first of which is adjacent and below said partition and a second of which is adjacent and above said bottom panel.

11. The air treatment unit with an integrated sound plenum of claim 1, wherein said dehumidification unit functions to dehumidify return air.

12. The air treatment unit with an integrated sound plenum of claim 1, wherein said dehumidification mechanism is removably fastened within said return plenum.

* * * * *